United States Patent
Page

(10) Patent No.: US 9,533,449 B2
(45) Date of Patent: Jan. 3, 2017

(54) MATERIAL DEPOSITION SYSTEMS WITH FOUR OR MORE AXES

(71) Applicant: Autodesk, Inc., San Rafael, CA (US)

(72) Inventor: James Sherwood Page, Oakland, CA (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 14/745,285

(22) Filed: Jun. 19, 2015

(65) Prior Publication Data

US 2015/0367375 A1 Dec. 24, 2015

Related U.S. Application Data

(60) Provisional application No. 62/014,453, filed on Jun. 19, 2014.

(51) Int. Cl.
*B05C 5/02* (2006.01)
*B29C 67/00* (2006.01)
(Continued)

(52) U.S. Cl.
CPC ......... *B29C 67/0055* (2013.01); *B29C 47/522* (2013.01); *B29C 67/0085* (2013.01);
(Continued)

(58) Field of Classification Search
None
See application file for complete search history.

(56) References Cited

U.S. PATENT DOCUMENTS 5,303,141 A * 4/1994 Batchelder .......... B29C 47/0866
156/244.11
5,316,219 A * 5/1994 Christyson .......... B05B 13/0431
239/101
(Continued)

FOREIGN PATENT DOCUMENTS

DE 10 2011 119 735 6/2013

OTHER PUBLICATIONS

*3-way extruder and colour blending nozzle Part 2—Build up and Printed things.* YouTube. Published Aug. 23, 2012. Retrieved on Sep. 10, 2014. Retrieved from the Internet: URL <http://www.youtube.com/watch?v=nkkbjpHVNZQ>, 2 pages.

(Continued)

*Primary Examiner* — Binu Thomas
(74) *Attorney, Agent, or Firm* — Fish & Richardson P.C.

(57) ABSTRACT

A system for fabricating an object includes an extruder for one or more deposition materials having at least one nozzle and a movable support for the nozzle. The nozzle has a nozzle axis and is rotatably attached to the movable support via a connector that is actuatable relative to the movable support to change an angular orientation of the nozzle axis, thus varying an angle between the nozzle axis and a deposition surface. The system also includes a controller that can apply a correction factor calculated for a path of the nozzle when an acute angle is formed between the nozzle axis and the deposition surface, the correction factor for moving toward the acute angle being different from that when moving away from it. The correction factor removes differences in thickness of the deposited material caused by variations in the angle formed between the nozzle axis and the deposition surface.

14 Claims, 24 Drawing Sheets

(51) Int. Cl.
*B29C 47/52* (2006.01)
*B33Y 30/00* (2015.01)
*B29C 47/48* (2006.01)
*B29C 47/78* (2006.01)
*B33Y 50/02* (2015.01)

(52) U.S. Cl.
CPC .......... *B29C 67/0088* (2013.01); *B33Y 30/00* (2014.12); *B29C 47/48* (2013.01); *B29C 47/786* (2013.01); *B29C 2947/92571* (2013.01); *B29C 2947/92904* (2013.01); *B33Y 50/02* (2014.12)

(56) References Cited

U.S. PATENT DOCUMENTS

| | | | |
|---|---|---|---|
| 5,943,235 | A | 8/1999 | Earl et al. |
| 5,960,411 | A | 9/1999 | Hartman et al. |
| 6,722,872 | B1 | 4/2004 | Swanson et al. |
| 6,749,414 | B1 | 6/2004 | Hanson et al. |
| 6,814,907 | B1 | 11/2004 | Comb |
| 7,122,246 | B2 | 10/2006 | Comb et al. |
| 7,754,807 | B2 | 7/2010 | Priedeman, Jr. et al. |
| 8,512,024 | B2 | 8/2013 | Pax |
| 9,339,974 | B2 * | 5/2016 | Spalt ................ B29C 67/0088 |
| 2001/0017085 | A1 * | 8/2001 | Kubo .................... B41J 25/003 101/35 |
| 2010/0021580 | A1 | 1/2010 | Swanson et al. |
| 2010/0100224 | A1 * | 4/2010 | Comb ................. B29C 67/0085 700/118 |
| 2011/0059256 | A1 * | 3/2011 | Ebisawa ............... B05C 5/0216 118/300 |
| 2011/0079936 | A1 | 4/2011 | Oxman |
| 2014/0034214 | A1 | 2/2014 | Boyer et al. |
| 2014/0070461 | A1 | 3/2014 | Pax |
| 2014/0291886 | A1 * | 10/2014 | Mark ................... B29C 47/004 264/163 |
| 2014/0328963 | A1 | 11/2014 | Mark et al. |
| 2014/0361460 | A1 | 12/2014 | Mark |
| 2015/0093465 | A1 | 4/2015 | Page |
| 2015/0108677 | A1 | 4/2015 | Mark et al. |
| 2015/0266235 | A1 | 9/2015 | Page |
| 2015/0266244 | A1 | 9/2015 | Page |
| 2015/0324490 | A1 | 11/2015 | Page |
| 2015/0367576 | A1 | 12/2015 | Page |

OTHER PUBLICATIONS

*CubePro 3D Printer.* CubePro. Published Jan. 6, 2014. Retrieved on Sep. 10, 2014. Retrieved from the Internet: URL <http://cubify.com/en/CubePro?gclid=CJbWgJizlcACFUiGfgod7zgA6A>, 7 pages.

Douglass, Carl. *Next Generation 3D Printer Extruders: The Rugged-HPX Line.* Kickstarter. Published Feb. 17, 2014. Retrieved on Sep. 10, 2014. Retrieved from the Internet: URL <https://www.kickstarter.com/projects/dglass3d/next-generation-3d-printer-extruders-the-rugged-hp>, 22 pages.

*MakerBot Replicator 2X.* MakerBot. Published Sep. 18, 2012. Retrieved on Sep. 10, 2014. Retrieved from the Internet: URL <http://store.makerbot.com/replicator2x>, 9 pages.

*Multicolor-extruder.* RepRap. Published Aug. 11, 2014. Retrieved on Sep. 10, 2014. Retrieved from the Internet: URL <http://reprap.org/wiki/Multicolor-extruder>, 3 pages.

*RepRap 3D printer 3-way extruder and colour blending nozzle Part 1—intro video.* YouTube. Published Aug. 23, 2012. Retrieved on Sep. 10, 2014. Retrieved from the Internet: URL <http://www.youtube.com/watch?v=_g0fiWx8RyM>, 3 pages.

*RUG/Pennsylvania/State College/Software/Parts/Dual Extruder.* PepRap. Published Aug. 6, 2014. Retrieved on Sep. 10, 2014. Retrieved from the Internet: URL <http://reprap.org/wiki/RUG/Pennsylvania/State_College/Software/Parts/Dual_Extruder>, 13 pages.

"Nike Air Huarache Run ID Shoe," [online] [Retrieved on Jan. 28, 2015]; Retrieved from the Internet URL: http://store.nike.com/us/en_us/product/air-huarache-run-id/?piid=39329&pbid=712882438, 6 pages.

"Style sheet (web development)," [online] [Retrieved on Jan. 28, 2015]; Retrieved from the Internet URL: http://en.wikipedia.org/wiki/Style_sheet_(web_development), 4 pages.

"T-shirt," [online] [Retrieved on Jan. 28, 2015]; Retrieved from the Internet URL: http://en.wikipedia.org/wiki/T-shirt, 7 pages.

"Upload your 3D Design," [online] [Retrieved on Jan. 28, 2015]; Retrieved from the Internet URL:http://www.shapeways.com/create?li=home-2ndPring-promo-create, 8 pages.

"3D printing," [online] [Retrieved on Jan. 28, 2015]; Retrieved from the Internet URL: http://en.wikipedia.org/wiki/3D_printing, 39 pages.

"3D Printer Software & Apps," [online] [Retrieved on Jan. 28, 2015]; Retrieved from the Internet URL: https://3dprinter.dremel.com/3d-printer-software-apps, 11 pages.

"How Shapeways 3D Printing Works," [online] [Retrieved on Jan. 28, 2015]; Retrieved from the Internet URL: http://www.shapeways.com/how-shapeways-works, 14 pages.

Moto X (1st generation), [online] [Retrieved on Jan. 28, 2015]; Retrieved from the Internet URL: http://en.wikipedia.org/wiki/Moto_X_(1st_generation), 10 pages.

Neri Oxman, U.S. Appl. No. 61/248,555, "Variable Property Rapid Prototyping (VPRP)," filed Oct. 5, 2009, 36 pages.

* cited by examiner

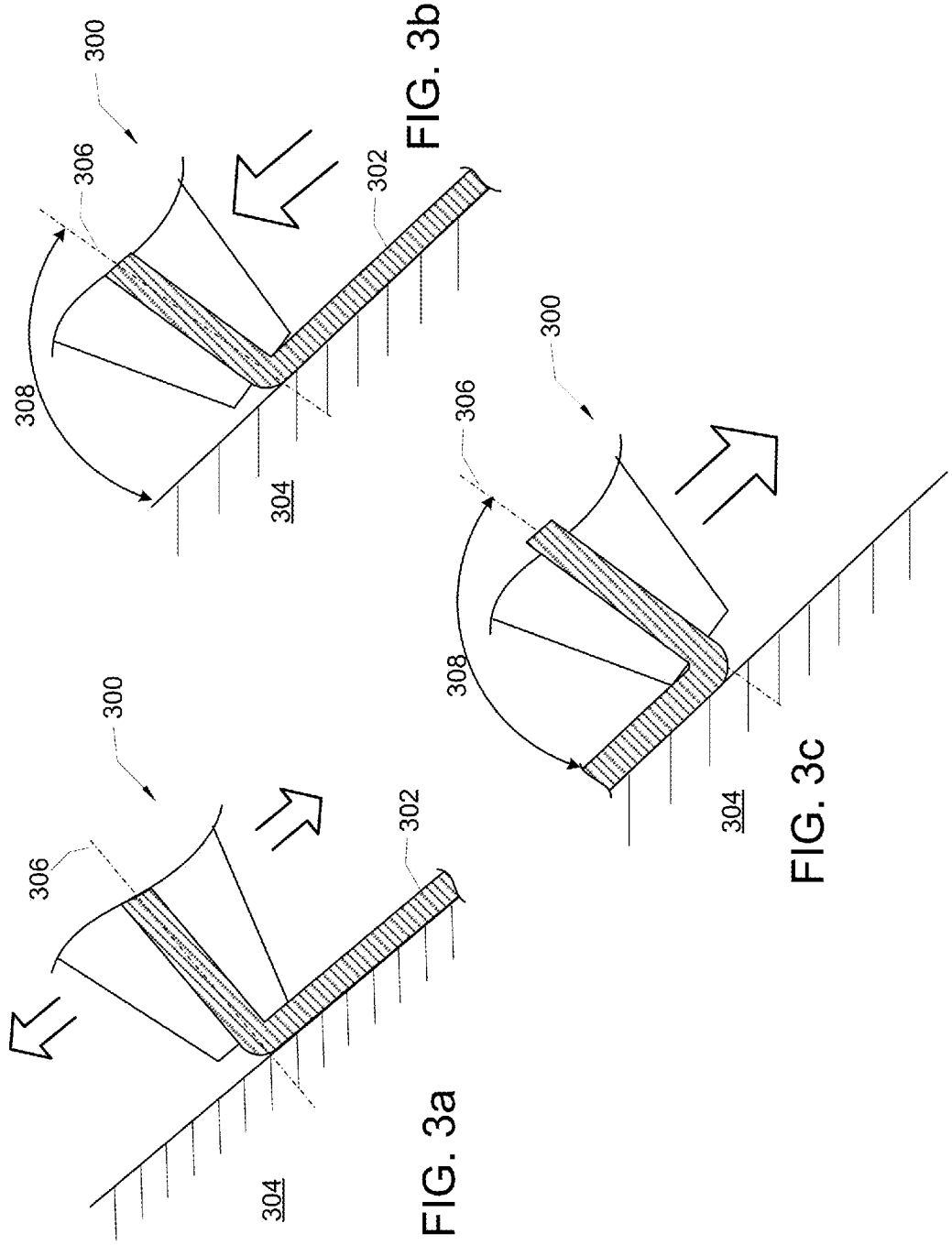

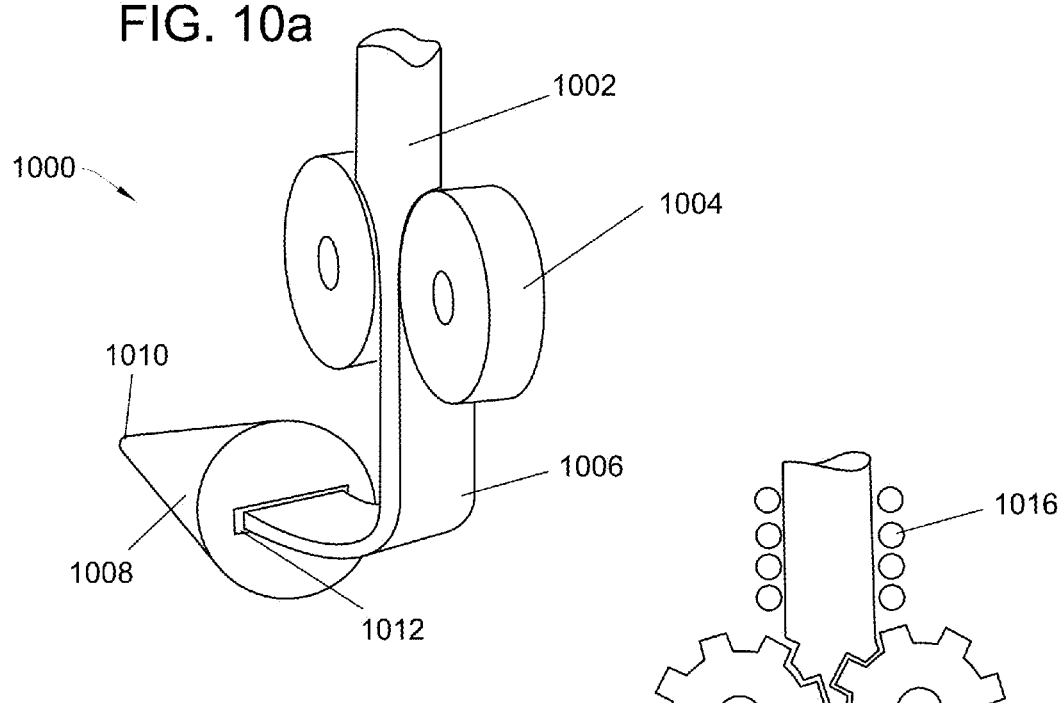
FIG. 10a
FIG. 10b
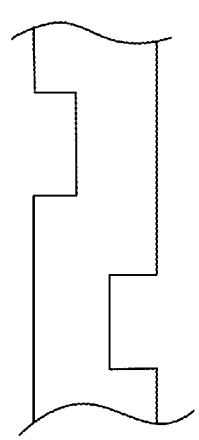
FIG. 10c

MATERIAL DEPOSITION SYSTEMS WITH FOUR OR MORE AXES

CROSS-REFERENCE TO RELATED APPLICATION

This application claims the benefit under 35 U.S.C. §119 (e) of U.S. Patent Application No. 62/014,453, titled MATERIAL DEPOSITION SYSTEMS WITH FOUR OR MORE AXES, filed Jun. 19, 2014. The disclosure of the above application is incorporated herein by reference in its entirety.

BACKGROUND

This specification relates to three dimensional (3D) printing or additive manufacturing, such as fused deposition modeling (FDM).

FDM using extruded polymer filament has evolved rapidly and is useful for creating reasonably accurate three dimensional objects quickly. Current FDM printing is typically accomplished by forcing a solid plastic feedstock through a heated nozzle with smaller diameter than the original feedstock. The filament is liquefied before or as it passes through the constriction in the nozzle, and the feed pressure causes material to be extruded with a cross section approximately equal to the nozzle exit. Other 3D printing techniques referred to in this application include selective laser sintering (SLS), stereolithography (SLA), direct metal laser sintering (DMLS) and material jetting processes such as ObJet.

SUMMARY

This specification relates to 3D printing or additive manufacturing, such as FDM.

According to one aspect, a system for fabricating an object includes: an extruder for one or more deposition materials, the extruder including at least one nozzle and a movable support for the nozzle, wherein the nozzle has a nozzle axis and is rotatably attached to the movable support via a connector that is actuatable relative to the movable support to change an angular orientation of the nozzle axis relative to the movable support so as to vary an angle between the nozzle axis and a deposition surface during deposition of a deposition material; and a controller coupled with the extruder, the controller configured and arranged to apply a correction factor calculated for a path of the nozzle based on the angle formed between the nozzle axis and the deposition surface being an acute angle, the correction factor for the nozzle moving toward the acute angle being different from the correction factor for the nozzle moving away from the acute angle. The correction factor removes differences in thickness of the deposited material caused by variations in the angle formed between the nozzle axis and the deposition surface.

Implementations according to this aspect may include one or more of the following features. For example, the connector can be configured to be actuated with at least two degrees of freedom for the nozzle relative to the movable support. The extruder can include a softening zone positioned upstream of an actuation point of the connector, the softening zone being configured to increase flexibility of a feedstock material passing through the softening zone. The softening zone can be configured to apply heat to the feedstock material passing therethrough. The extruder can include forming rollers that are configured to flatten the feedstock material passing therethrough. The nozzle can include the connector. The system can be configured to move the movable support and the nozzle relative to the object being fabricated along three orthogonal axes to thereby provide three degrees of freedom relative to the object, the nozzle being rotatably attached to the movable support via the connector to rotate about a first axis that is transverse to the nozzle axis to thereby provide a fourth degree of freedom relative to the object, and the system can include a rotatable base on which the object being fabricated is placed, the controller being configured to rotate the base during deposition to thereby provide a fifth degree of freedom between the nozzle and the object. In some cases, the system can be configured to move the movable support and the nozzle relative to the object being fabricated along three orthogonal axes to thereby provide three degrees of freedom relative to the object, the nozzle being rotatably attached to the movable support via the connector to rotate about a first axis that is transverse to the nozzle axis to thereby provide a fourth degree of freedom relative to the object, and the connector can be rotatably connected to the movable support to allow the connector and the nozzle to rotate about the nozzle axis to thereby provide a fifth degree of freedom relative to the object. In some cases, the system can be configured to move the nozzle relative to the object being fabricated along three orthogonal axes to thereby provide three degrees of freedom relative to the object, and the connector can include a multi-link coupler that is rotatably attached to the movable support to rotate about a first axis that is transverse to the nozzle axis, the nozzle being rotatably attached to the multi-link coupler to rotate about a second axis that is transverse to the first axis to thereby provide two additional degrees freedom relative to the object. The correction factor can cause the path of the nozzle to become farther from the surface of the object when the nozzle is moving away from the acute angle. The correction factor can cause the path of the nozzle to become closer to the surface of the object when the nozzle is moving toward the acute angle. Based on the nozzle moving away from the acute angle, the controller can be apply the correction factor that causes the path of the nozzle to become farther from the surface of the object, and based on the nozzle moving toward the acute angle, the controller can apply the correction factor that causes the path of the nozzle to become closer to the surface of the object. Based on determining that the nozzle makes contact with any portion of the system or the object, the controller can cause the angular orientation of the nozzle to change to avoid making contact. The extruder can include a feedstock channel through which a feedstock material passes during deposition, the feedstock channel providing a curved path between the extruder and the rotated nozzle, and wherein the controller is configured to change a volume flow rate of the feedstock material according to a curvature of the feedstock channel.

According to another aspect, a non-transitory computer-readable medium storing software includes instructions executable by one or more computers, which, upon such execution, cause the one or more computers to perform operations for controlling a 3D printer to create a 3D object, the 3D printer including an extruder for one or more deposition materials, the extruder including at least one nozzle and a movable support for the nozzle, wherein the nozzle has a nozzle axis and is rotatably attached to the movable support via a connector that is actuatable relative to the movable support to change an angular orientation of the nozzle axis relative to the movable support so as to vary an angle between the nozzle axis and a deposition surface during deposition of a deposition material. The operations include applying a correction factor calculated for a path of the nozzle based on the angle formed between the nozzle axis and the deposition surface being an acute angle, the correction factor for the nozzle moving toward the acute angle being different from the correction factor for the nozzle moving away from the acute angle, and causing movement of the nozzle along the path to deposit material to form the object, wherein the correction factor removes differences in thickness of the deposited material caused by variations in the angle formed between the nozzle axis and the deposition surface.

According to yet another aspect, a process for additively fabricating components with improved resistance to delamination includes using a material deposition system and depositing one or more first material segments of a first material with at least one first locking portion and one or more secondary material segments of a second material with at least one second locking portion. The second locking portions have a shape that is defined by the shape of the first locking portions such that the second locking portions form an interlock with the first locking portions. The first and second material segments can each include a continuous material. Components can be fabricated from such continuous materials to have comparable resistance to delamination or breakage in all directions.

Implementations according to this aspect may include one or more of the following features. For example, the first and/or second materials can include continuous fibers. The materials can include composite materials such as fibers and a matrix material. The matrix material can be a thermoplastic. The fibers can have a range of lengths, and the matrix material can be, for example, concrete or another cement-like or similar hardening mineral compound. In some cases, the matrix material can be a thermoset. The first and second materials can be deposited through a nozzle having an orifice. In some cases, the first and second materials can be made from the same material. The first material segments and second material segments can be formed from a continuous material (i.e. forming the second material segment after the first material segment without cutting the material so they are connected and continuous). Avoiding cutting fibers and restarting the deposition process can have several benefits including improving speed and reliability of the process as well as part strength. The first interlocking portions can include gaps, and second interlocking portions can include tabs. Here, the tabs can be formed by forcing the second material into the gaps. In some cases, the gaps can include a narrow region and a wider region, and the second material can be forced through the narrow region into the wider region to form a physical interlock between the second interlocking portion and the first interlocking portion. The first material segments can take the form of one or more first material layers, and the secondary material segments take the form of one or more secondary material layers. The interlock can prevent delamination of the second material layers from the first material layers. The material layers can be curved or non-planar. The material deposition system can control at least two translational and one rotational degrees of freedom (i.e. axes of motion) between the component being built and the material deposition system.

The details of one or more implementations of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIGS. 3a-3f show an example variable angle nozzle depositing material on a sloped surface according to an implementation of this disclosure.

FIGS. 10a-10c show example implementations of a roller-based feeding system.

Like reference numbers and designations in the various drawings indicate like elements.

DETAILED DESCRIPTION

Figure 1:
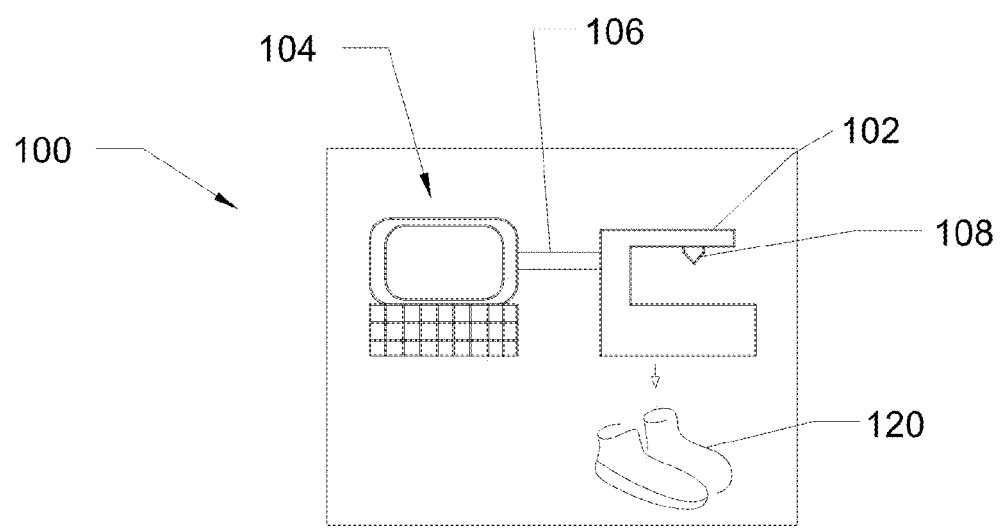
FIG. 1 shows an example FDM 3D printing system.

Referring to FIG. 1, an example FDM 3D printing system 100 includes an extruder or 3D printer 102, a controller 104, and a communication link 106 that links the extruder 102 to the controller 104. The 3D printer 102 includes an extruder nozzle 108. The FDM system 100 can produce 3D products such as item 120. The controller 104 can include one or more processors, memory, hard drive, solid-state drive, and/or input devices such as touch screen, mouse, or voice input capability. In some cases, the controller 104 can be an internet server or some other device, computer, processor, phone, or tablet. In some cases, the controller 104 and extruder 102 are integrated into a single 3D printing device.

Figure 2A:
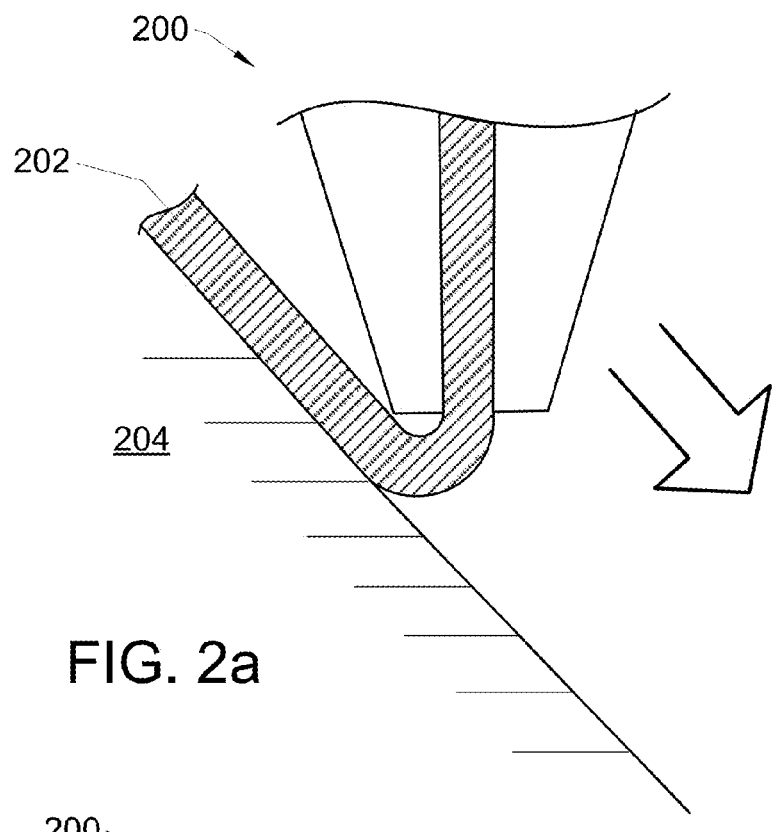
FIGS. 2a and 2b show a fixed angle nozzle depositing material on a sloped surface.

Referring now to FIG. 2a, a nozzle 200, for example from an FDM system such as system 100, is shown depositing material 202 on a sloped part surface 204 with a motion of travel in a downward sloping direction along part surface 204. The nozzle 200 can be a nozzle tip designed for use with an FDM system or it can be from a different material deposition system such as a welding tip or electrode, syringe, adhesive material deposition system, material solidification system, material curing system or material pump, or combinations thereof. As shown the nozzle 200 is constrained to maintain its vertically oriented position. In other words, the nozzle 200 can move along, for example, the x, y, and z coordinates during deposition but will not be able to further change the angle at which it deposits material. Accordingly, the system depicted in FIG. 2a may be referred to as a 3-axis FDM system. Implementations of the 3-axis FDM system are further described in related U.S. patent application Ser. No. 14/663,393, filed Mar. 19, 2015, titled SYSTEMS AND METHODS FOR IMPROVED 3D PRINTING, hereby incorporated by reference in its entirety.

Figure 2B:
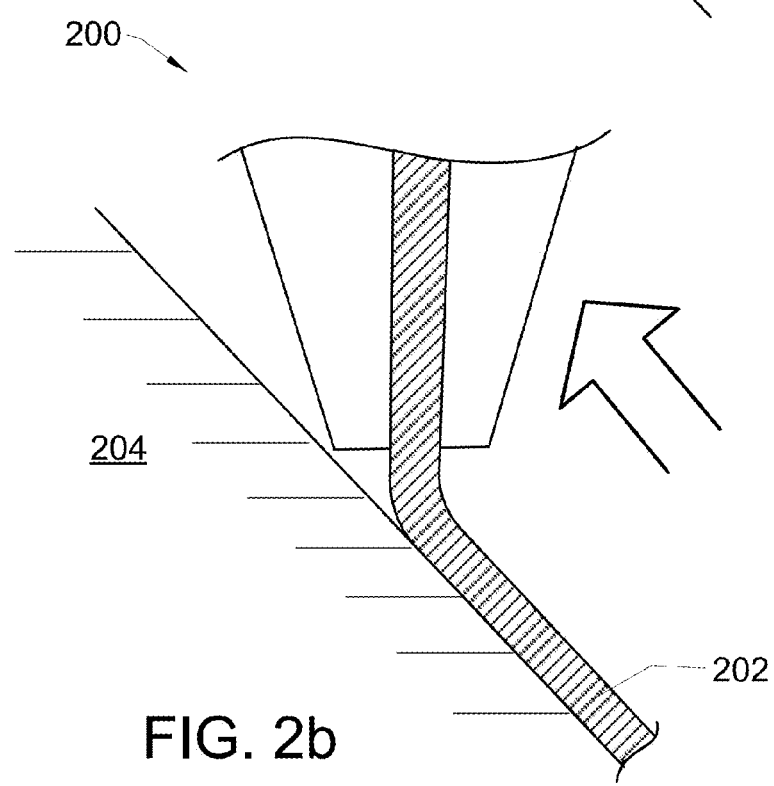

FIG. 2b shows the nozzle 200, likewise constrained to the vertical orientation, depositing material 202 on the sloped part surface 204 with a motion of travel in an upward direction along the part surface 204. Here, the nozzle 200 is shown moving uphill relative to the part surface 204 instead of downhill as in FIG. 2a. The nozzle 200 can be a nozzle designed for use with an FDM system or it can be from a material deposition system such as a welding tip or electrode, syringe, adhesive material deposition system, material solidification system, material curing system or material pump or combinations thereof.

As shown in FIGS. 2a and 2b, the distance between the nozzle 200 and the part surface 204 can be varied depending on whether the nozzle 200 is moving downward or upward to thereby ensure that the resulting deposited material thickness can be similar or the same when the nozzle travels downhill or uphill or horizontally.

For example, in one method of correcting the position or path of the nozzle 200, corrections can be made in the following way: a first nominal path or set of positions for the nozzle 200 is computed independent of the direction of travel of the nozzle 200 or the slope of the path of the nozzle 200. Then a second path can be created by adjusting vertical position values by an amount dependent on the slope of the path of the nozzle 200. The slope of the path may be defined as vertical distance moved over an interval divided by horizontal distance moved over the same interval, or as rate of instantaneous vertical motion divided by rate of instantaneous horizontal motion.

FIGS. 3a, 3b, and 3c show material deposition on a sloped surface by an FDM system with a nozzle that is not constrained to be vertical. This can be for example an FDM system with additional axes to allow rotation of the nozzle, which is discussed in further detail below.

Referring to FIG. 3a, a nozzle 300 is shown depositing material 302 along a surface with the nozzle axis perpendicular to a local surface 304. In this case, the nozzle 300 can deposit the material 302 to have the same thickness while traveling in either direction along a given path. That is, the path can be the same for a nozzle moving in either direction to deposit material of a desired thickness.

Referring to FIG. 3b, the nozzle 300 is shown depositing the material 302 along a sloped surface in an orientation such that the nozzle axis is not perpendicular to the local surface 304. The nozzle 300 shown in FIG. 3b can have one or more movable angle motion degrees of freedom or actuation so that the angle of a nozzle axis 306 with respect to vertical can be changed or can change along a path. The nozzle 300 in FIG. 3b can have an acute angle 308 between its axis and the surface on one side (the "acute angle side"). The nozzle 300 in FIG. 3b is shown traveling toward the side that forms the acute angle side as it deposits material that is left behind on the local surface 304.

Referring to FIG. 3c, the nozzle 300 is shown in a similar configuration as in FIG. 3b, that is, in the same orientation as in FIG. 3b while depositing material along the same sloped surface, but is instead shown moving away from the side that forms the acute angle. In order to deposit material of a given desired thickness, the nozzle 300 must follow a different path while moving toward the acute angle side as in FIG. 3b as compared to moving away from the acute angle side as in FIG. 3c. The path that the nozzle 300 follows can be closer to the surface 304 when the nozzle moves toward the acute angle as in FIG. 3b and the path can be farther away from the surface 304 when the nozzle 300 moves away from the acute angle as in FIG. 3c in order to deposit material of the same thickness in both cases.

Generally, a nominal path may be a path that a nozzle with axis perpendicular to the local surface should follow to deposit material of a given thickness in either direction. A nominal path may be adjusted to accommodate a non-perpendicular angle between the nozzle and the local surface while still depositing material of the same thickness by adjusting the path away from the local surface in areas where the nozzle moves away from the acute angle between the nozzle axis and the surface and adjusting the path to be closer to the surface in areas where the nozzle moves toward the acute angle.

Figure 3D:
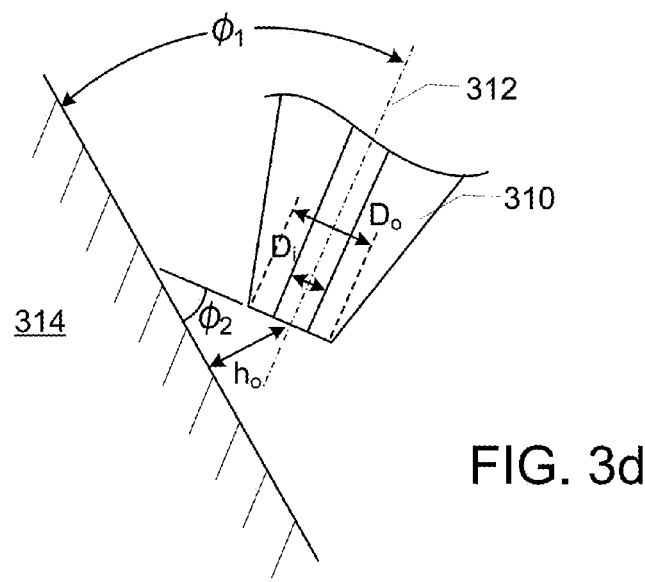

Referring now to FIG. 3d, a nozzle 310 with an orientation angle $\Phi_1$ between a nozzle axis 312 and a part surface 314. The angle between the surface 314 and a plane perpendicular to the nozzle axis can be defined as angle $\Phi_2$. $\Phi_2$ can therefore represent the angle of the nozzle tip to the part surface at a specific location. As shown, the nozzle has a tip outer diameter $D_o$ and a tip inner diameter $D_i$. Nozzle tip inner diameter $D_i$ can represent a nozzle exit orifice. A nominal path for the nozzle to follow can be represented by a series of position points, such that at each point along the nominal path there can be a distance, $h_o$, between the local surface and the center of the nozzle exit orifice, where $h_o$ can be measured perpendicular to the local surface.

Figures 3E, 3F:
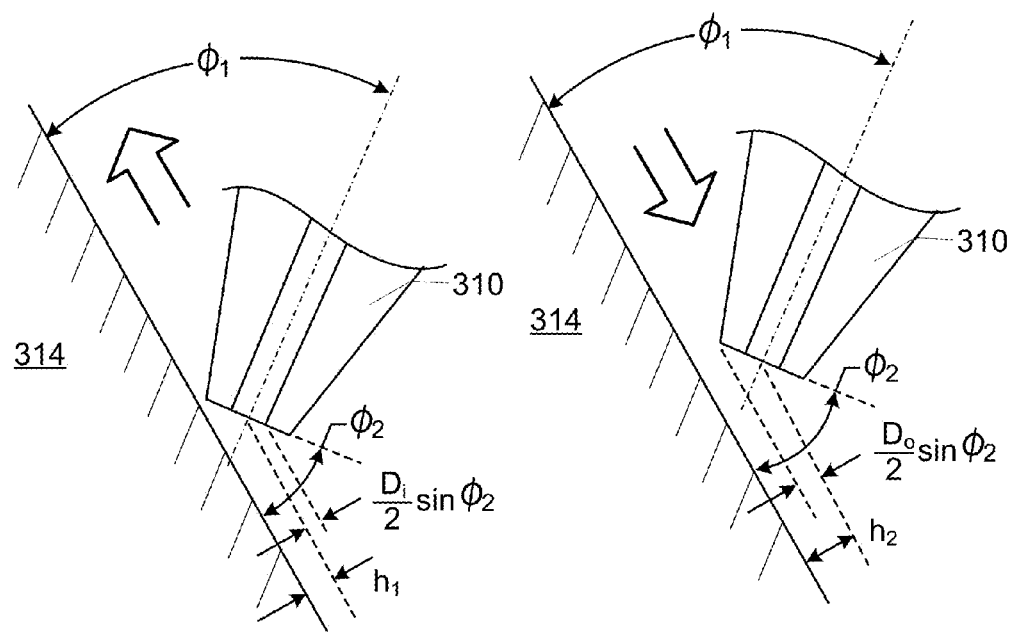

FIG. 3e shows the nozzle 310 of FIG. 3d traveling toward the side that forms the acute angle $\Phi_1$. The angle $\Phi_2$ is similarly shown as in FIG. 3d. In order for the nozzle 310 with angle $\Phi_1$ to deposit material having the same thickness as a nozzle that is perpendicular to the local surface (for example, see FIG. 3a), an adjustment can be made to the path of travel such that a new distance between the surface and the center of the nozzle exit orifice, $h_1$, is less than $h_o$. One example way to accomplish this adjustment can be by making the following calculation: adjustment'=$(D_i/2)$*sin$(\Phi_2)$. The new path point can be found as: $h_1=h_o$-adjustment$_1$. Corresponding x,y,z coordinates or other suitable coordinates can be calculated with knowledge of $\Phi_2$, $h_o$, and $h_1$. The path in this case can be closer to the surface than the nominal path because the inside edge of the nozzle orifice largely determines the resulting material thickness.

FIG. 3f shows the nozzle 310 of FIG. 3d traveling in a direction away from acute angle $\Phi_1$. Again, $\Phi_2$ is defined the same as in FIG. 3d. In order for the nozzle 310 with angle $\Phi_1$ to deposit material in the same thickness as a nozzle that is perpendicular to the local surface (not shown here, but see FIG. 3a), an adjustment can be made to the path of travel such that a new distance between the surface and the center of the nozzle exit orifice, $h_2$, is greater than $h_o$. One example way to accomplish this adjustment can be by making the following calculation: adjustment$_2$=($D_o$/2)*sin($\Phi_2$). The new path point can be found as: $h_1$=$h_o$+adjustment$_2$. Corresponding x,y,z coordinates or other suitable coordinates can be calculated with knowledge of $\Phi_2$, $h_o$, and $h_2$. The path in this case can be farther from the surface than the nominal path because the outside edge of the nozzle tip largely determines the resulting material thickness.

Other calculations can be used to make corresponding adjustments based on $\Phi_2$, $h_o$, and $h_1$. In some cases, one or more of nozzle geometry, type of material being deposited, surface properties, etc. can be used to determine the necessary adjustments.

Figure 4:
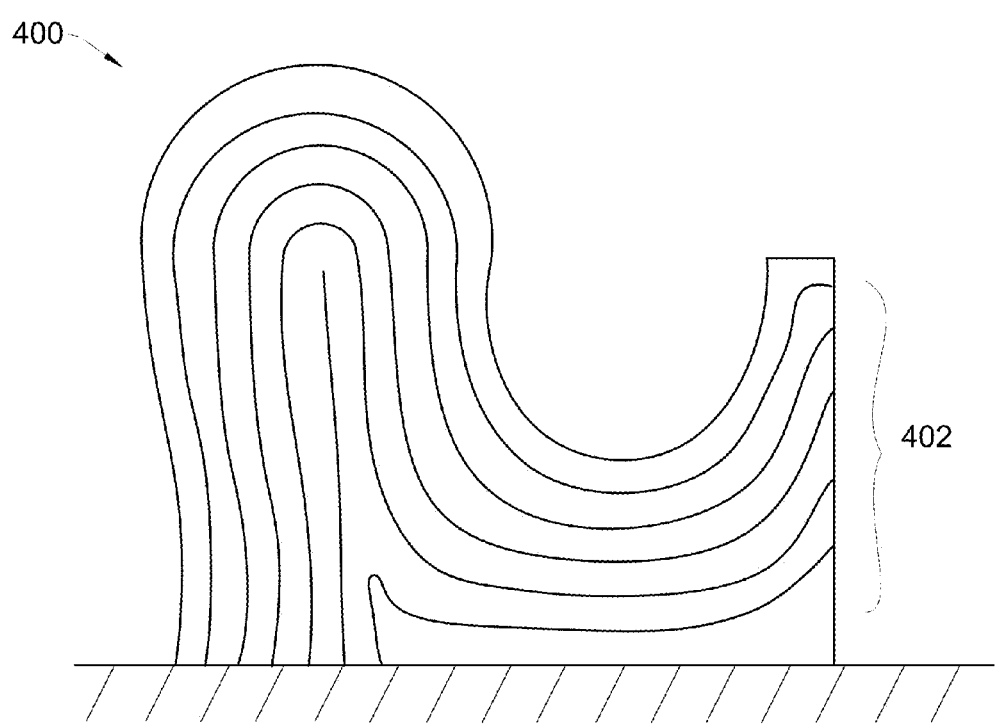
FIG. 4 shows a cross section view of a sample part made using a 5-axis FDM system.

Referring now to FIG. 4, a cross-section of an example part 400 is shown. The part 400 may be made by using a 5-axis FDM system or other material deposition system with a nozzle that can change angular orientation relative to the part. Part 400 is made of multiple layers 402 of deposited material that may be non-planar. In some cases, such layers 402 of deposited material may have a tendency to split or delaminate at layer interfaces.

Figure 5:
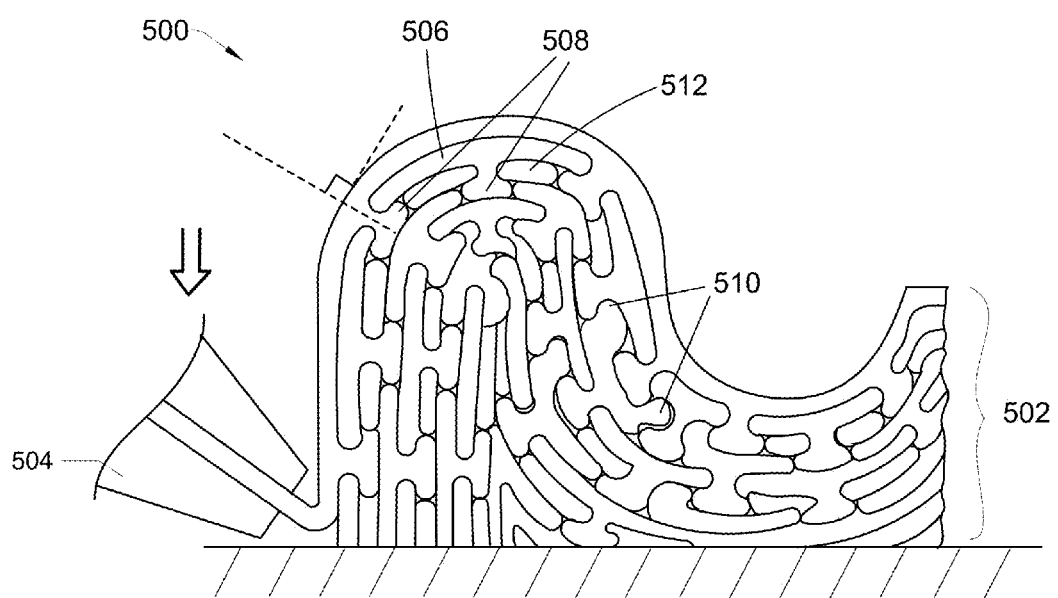
FIG. 5 shows a cross section of a sample part with interlocking layers made using a 5-axis FDM system.

FIG. 5 shows a cross section of a part 500 that is similar to the part 400 of FIG. 4, except that layers 502 shown in FIG. 5 are locked together so that they are prevented or mitigated from splitting or delaminating at layer interfaces. Layers 502 can be made up of structural members 506 which are deposited as material from a nozzle 504 that then solidifies. Structural members 506 can be formed in several types with different features which combine to create an interlocking effect.

For example, layers can be deposited starting with the innermost layers and proceeding to the outermost layers. An $n^{th}$ layer can be deposited with one or more gaps of a first width. Then, a next layer (n+1 layer) can be deposited with gaps of a second width which can be narrower than the first width and which can be aligned with the gap(s) of the $n^{th}$ layer. A subsequent layer (n+2 layer) can be deposited over or outside of the n+1 layer with sufficient material and deposition speed or pressure that the material of the n+2 layer flows through the gap in then n+1 layer and into the gap in the $n^{th}$ layer. The n+2 layer material can partially or completely fill the gap(s) in the $n^{th}$ and n+1 layers. If the gap(s) in the $n^{th}$ layer are larger than the gap(s) in the n+1 layer, the N+2 layer material can form a physical interlock with the material of the other layers. The n+2 layer material that flows into the gaps in the other layers can be a locking feature 508. Each layer can alternately have gaps of different widths at different locations as well as locking features so that all or nearly all of the layers can be sequentially interlocked. This construction can be effective at eliminating layer separation or delamination. The part 500, formed in this or other similar manner, can include one or more of flat, concave, and convex portions.

In some cases, it can be possible to create useful layer interlocking with different layers having gaps of the same width or with combinations of just single gap-layers plus layers with locking features (i.e., without the stacking of multiple layers with aligned gaps). The layers 502 and associated gaps as well as locking features can be formed with the nozzle 504 being in various orientations. In some cases, the nozzle (and its corresponding nozzle axis) can remain vertical during material deposition, as in the case of a conventional 3-axis (x,y,z) FDM system. In some cases, the nozzle can be kept perpendicular to the local part surface during the deposition process. In some cases, the nozzle can have a variable angle with respect to the local part surface in order to facilitate certain features such as forming the base of a vertical wall next to a baseplate. For example, FIG. 5 shows the nozzle 504 completing a section of vertical wall next to a baseplate and shows the nozzle 504 at a non-perpendicular angle to the part surface to avoid crashing into the baseplate or other portions of the FDM system. Additionally, or alternatively, the angular orientation of the nozzle may be changed from a perpendicular angle to a non-perpendicular angle, or in some cases from a first non-perpendicular angle to a second non-perpendicular angle different from the first, to avoid making contact with an already deposited portion of the object being fabricated. In some cases, by changing the angular orientation of the nozzle to avoid making contact with parts of the FDM system or the object being fabricated, the possible coverage area of the nozzle may be increased. In other words, the nozzle, by changing its angular orientation to avoid making contact, could deposit materials into tighter spaces than would be otherwise possible without making such angle re-adjustments. Referring to FIG. 5, as an example, the nozzle 504 can, by rotating in a clockwise direction to avoid hitting the base, deposit material closer to the intersection between the object and the base.

Locking features can be formed with the nozzle perpendicular to the local part surface or with the nozzle angled off of perpendicular to the local part surface. Layers and structural members can also be formed with overhangs 510 adjacent to locking features of other layers in order to create an interlocking structure. In some cases, interference members 512 can be deposited to help further improve interlocking between layers.

For a 5-axis FDM system or other material deposition system with a nozzle that can change angular orientation relative to the part, a compact, angularly variable distal end can help the nozzle reach into tight spaces. To achieve this, it is generally desired to have one of the angular articulation axes as close to the "tip"—or point where material is dispensed—as possible. However, based on conventional feedstock dispensing systems, it can be challenging to get a solid feedstock filament to go around such a sharp bend at the end before being pushed out of the tip.

Figure 6A:
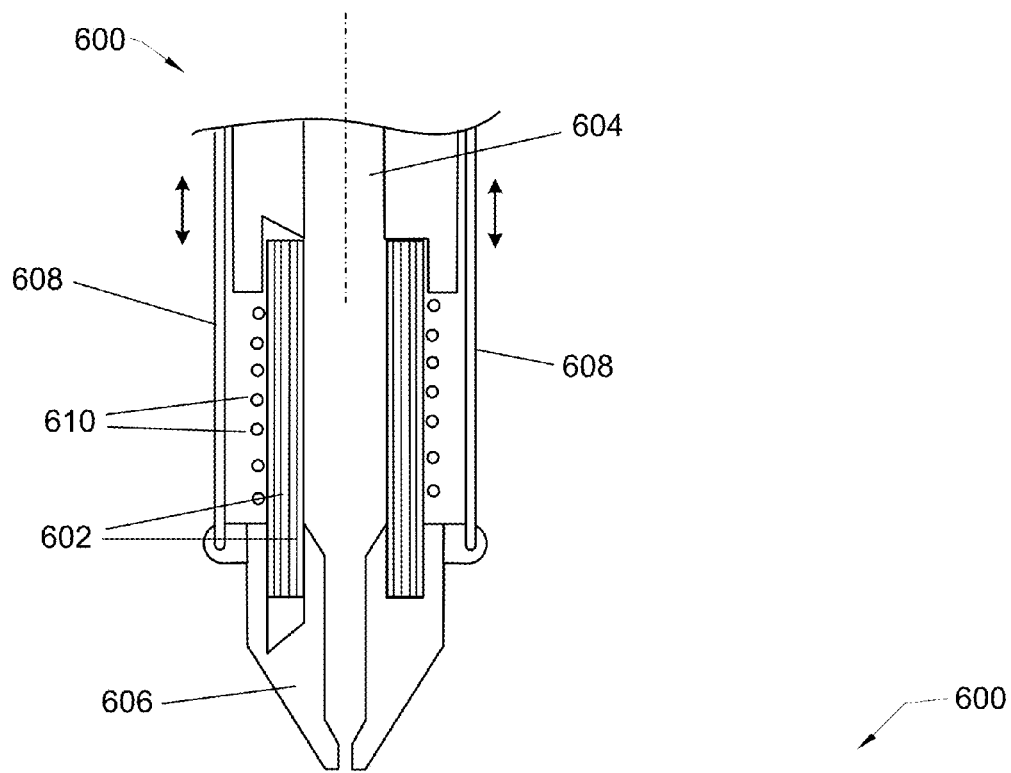
FIGS. 6a-6b show side cross section views of an example implementation of an articulating material dispensing system.
Figure 6B:
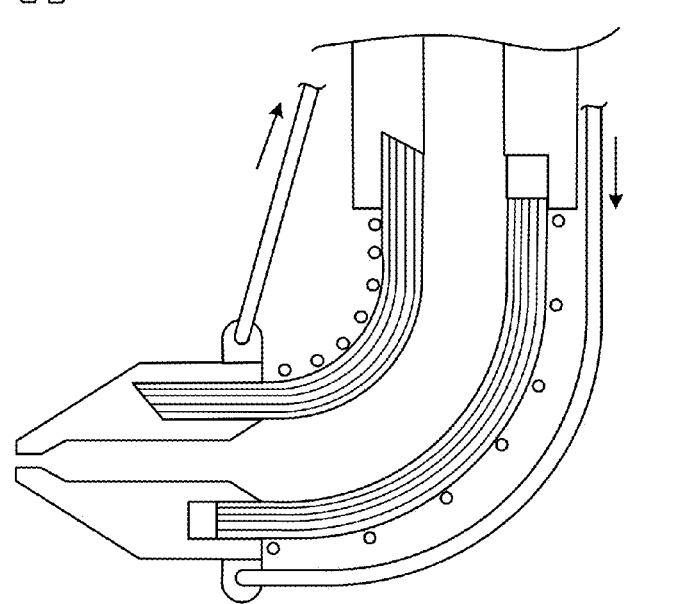

Referring to FIGS. 6a and 6b, an articulating material dispensing system 600 is shown, with FIG. 6a showing the articulating material dispensing system 600 in a nominal (vertical) configuration and FIG. 6b showing the articulating material dispensing system 600 in an articulated (flexed) configuration.

As shown, the material dispensing system 600 can include flexible strips 602 which form the sides of a material channel 604. There can be multiple flexible strips 602 in a leaf-spring structure that enables the width of the material channel 604 to be maintained throughout the range of articulation. A nozzle 606 can be employed at the distal end of the material dispensing system 600 to create a specific exit orifice size and control the flow of material. Cables 608, as well as pushrods or other types of actuators, can be used to pull and/or push on the material dispensing system to cause controllable articulation. In some cases, a flexible sleeve can be used to hold the flexible strips 602 in place. Heating elements 610 can be used to heat the material flowing through the flexible portion of the system or can be used to heat the nozzle itself. Heating material flowing through the flexible portion of the system can help liquefy or soften the material which may allow the material to more easily flow around a corner when the system 600 is articulated. The flexible strips 602 can be used to shift in the nozzle axial direction (or along the length of the curve) to enable articulation (see FIG. 6*b*). Because creating the curvature, as indicated by the changing lengths of the flexible strips 602, may require more feedstock material to ensure a continuous flow of material, the volume flow of material per distance, or extrusion ratio, may need to be increased in cases where there are curvatures in the feedstock channel.

In some cases, a material drive system such as a drive wheel can be located proximal to the articulating section. Alternatively, or additionally, a material drive system such as the drive wheel can be located distal to the articulating section. In cases where the feedstock material is softened or liquefied for improved passage through the articulating section, the feedstock material can be cooled, for example via a cooling zone, prior to being driven by the driven wheel.

The position of the exit orifice with respect to the degree of articulation or direction of articulation may be characterized so that for a given articulation amount (i.e. amount of bending) the position of the nozzle exit orifice can be known with little error.

Figure 7A:
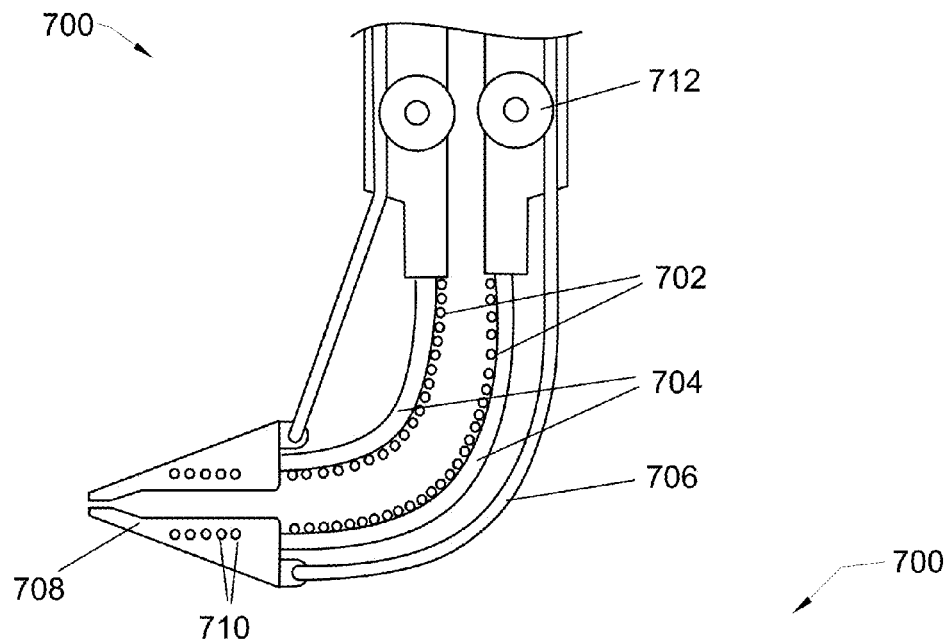
FIGS. 7a-7b show side cross section and isometric views of another example implementation of an articulating material dispensing system.
Figure 7B:
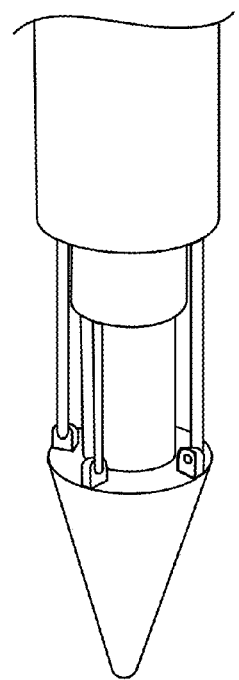

Referring to FIGS. 7*a* and 7*b*, an articulating material dispensing system 700, an alternative implementation, is shown. The system 700 shown in FIGS. 7*a* and 7*b* is similar to that of FIGS. 6*a* and 6*b* except that the material dispensing channel can be lined with or defined by a coil spring or set of material rings 702 in the articulating portion of the system. A coil spring can be used to define the material dispensing channel and can enable the channel size to stay relatively constant during articulation. A flexible sleeve 704 can surround the coil spring and further guide it or constrain its shape. Cables 706, as well as pushrods, linkages, hydraulic actuators, inflatable bladders, muscle wires, or the like, can be used to control the degree of articulation of the system 700.

In the example shown in FIG. 7*b*, the system 700 is shown with 4 cables for articulation (one is hidden behind other components). This way, the system 700 can be articulated in multiple directions (i.e. can have multiple degrees of freedom). When combined with a 3-axis gantry system, a net system with 5 (five) axes of motion can be created (in addition to motion of the dispensed material). Additional translation and rotation axes are also possible to create 6, 7, 8, or more axes of motion and to allow the fabrication of a wide range of part shapes.

A nozzle 708 is shown at the distal end of the system 700 to control material flow and create an exit orifice. Heating elements 710 are shown in the nozzle 708, but they can also or alternately be in the articulating section or proximal to (i.e. above) the articulating section. FIG. 7*a* also shows drive wheels 712 (or a drive wheel and an idler wheel) that are shown proximal to the articulating section, though they can also be located at the articulating section or distal to it, for example in the nozzle 708.

Figure 8A:
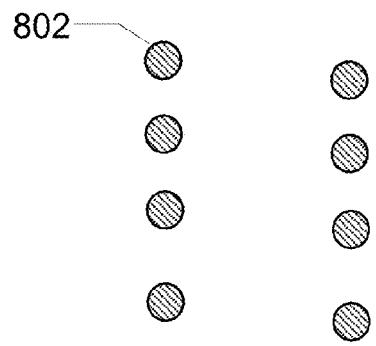
FIGS. 8a-8d show various views of an example material guide system.
Figure 8B:
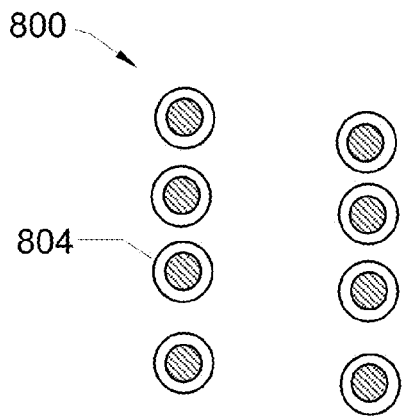

Referring to FIGS. 8*a*-8*d*, a material guide system 800 can be used in an articulating material dispensing system such as that of FIGS. 7*a* and 7*b* to help guide the feedstock material. FIG. 8*a* shows a cross section of a plain coil spring 802. FIG. 8*b* shows a cross section of the same coil spring 802 with the addition of contoured rollers 804 which can be threaded onto the spring and which can individually rotate about the spring such that material passing axially through the center of the spring might contact the rollers and might experience low resistance to axial motion due to the ability of the rollers to rotate.

Figure 8C:
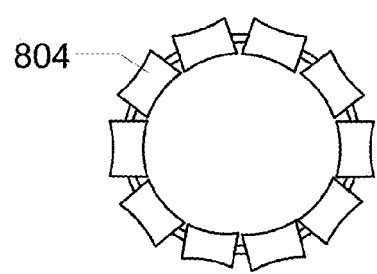
Figure 8D:
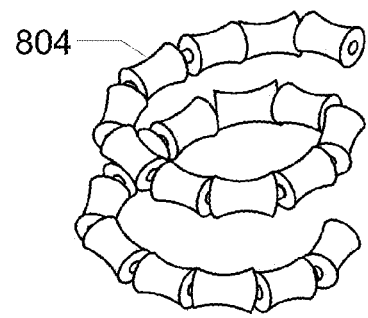

FIG. 8*c* shows a top view of the material guide system 800 of FIG. 8*b*, and FIG. 8*d* shows an isometric view of the same. The material guide system 800 as shown in FIGS. 8*a*-8*d* can allow a material dispensing system to articulate (bend) while adding minimum resistance to feed motion of the material.

Figure 9:
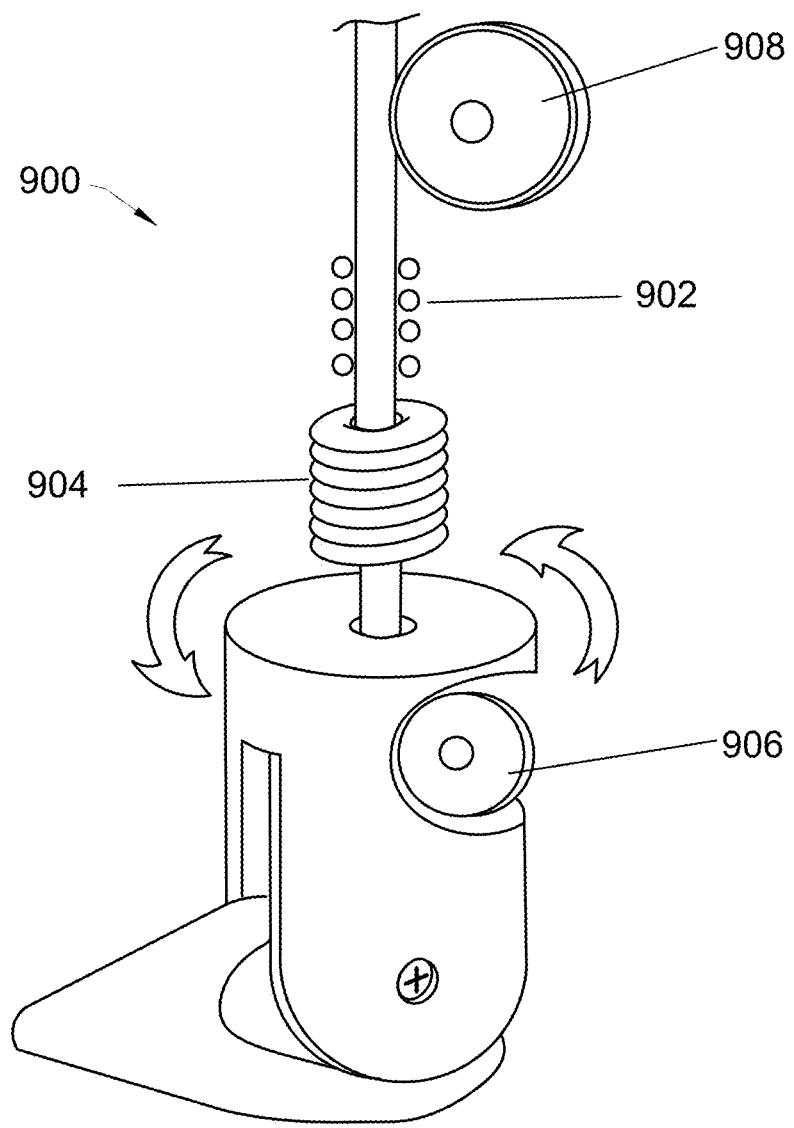
FIG. 9 shows an isometric view of another example implementation of an articulating material dispensing system.

Referring to FIG. 9, a material dispensing system 900 having two rotational degrees of freedom is shown. As shown, the first rotational degree of freedom allows the system to rotate about an axis that can be aligned with the entering feedstock—i.e. a vertical axis in the orientation of the system shown in FIG. 9. The second rotational degree of freedom allows a nozzle to rotate about an axis that can be perpendicular to the axis of the first rotational degree of freedom. Continuous rotation of the first rotational degree of freedom can be possible if "winding up" of the feedstock can be eliminated. One or both of the heating zone and a cooling zone can be included. The heating zone 902 can help soften the feedstock to the point that it alleviates wind-up of the material (i.e. it allows arbitrary angular dislocation of the distal portion of the feedstock relative to the proximal portion). As material is continually fed through, any adverse effects of the local twisting of the material can be alleviated as that material is passed out of the nozzle and fresh feedstock material arrives to be heated so it can take up any further twisting of the system. A cooling zone 904 can help enable the material to solidify again before it is fed into the nozzle. A final drive wheel 906 can be used to provide the necessary driving force to controllably feed the feedstock into the nozzle. The material can be re-heated and softened or liquefied in the nozzle. An initial drive wheel 908 can be included to help drive the feedstock into the heating zone 902.

In some cases, the feedstock material can be pinched and/or formed into flattened and/or ridged sections to help facilitate going around corners. For example, referring now to FIGS. 10*a*-10*c*, a material deposition system 1000 changes the cross section shape of the feedstock so that the feedstock can more easily turn a tight corner.

FIG. 10*a* shows a cylindrical feedstock 1002 being fed through rollers 1004 which can squeeze it and transform the fed-through portion to a ribbon section 1006 to have a thin rectangle or other cross-sectional shape with one thin dimension so that the feedstock can bend around a corner more easily or with lower force. A nozzle 1008 can provide an exit orifice 1010. The nozzle 1008 can have an opening 1012 shaped correspondingly to accept the reshaped feedstock, for example it can have a rectangular opening. The shape of the exit orifice 1010 can be any required shape, for example it can have a circular shape. The feedstock can be heated before entering the feed rollers so that it is softened and its cross section shape can be more easily changed. The feedstock can be cooled as it passes between the rollers or it can be cooled after it passes through the rollers so that it solidifies and its shape is stable before it enters the nozzle. Additional elements of the material dispensing system 1000, for example guides, can further be provided to improve operation.

FIG. 10*b* shows rollers 1014, which is another version of the forming rollers 1004 of FIG. 10*a*, that has roller shapes that create a resulting material shape that has positive drive features. For example, the resulting reshaped feedstock can have a constant cross section area along its length so that a constant motion of the feedstock should result in a constant material flow rate out of a nozzle. A heating zone 1016 can be positioned at an upstream position relative to the rollers 1014 to soften the feedstock material for improved form-ability. FIG. 10c shows another possible reshaped feedstock shape with positive drive features.

Figure 11A:
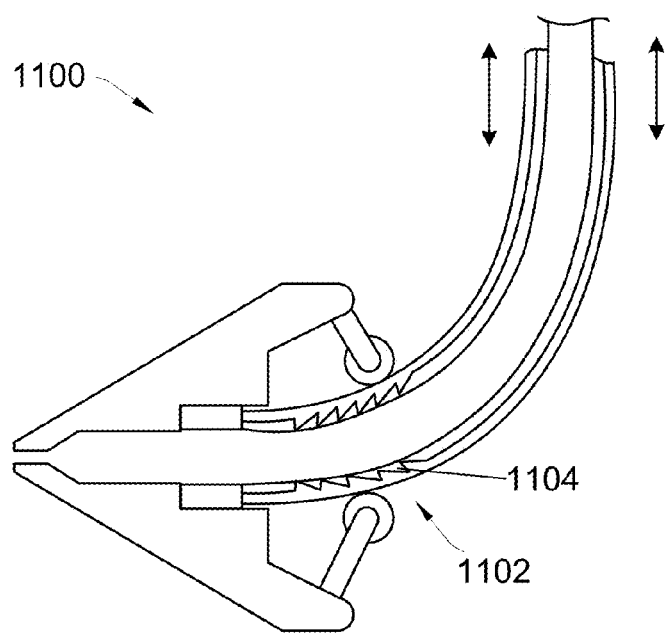
FIGS. 11a-11b show an example implementation of an articulating material dispensing system having drive dogs.
Figure 11B:
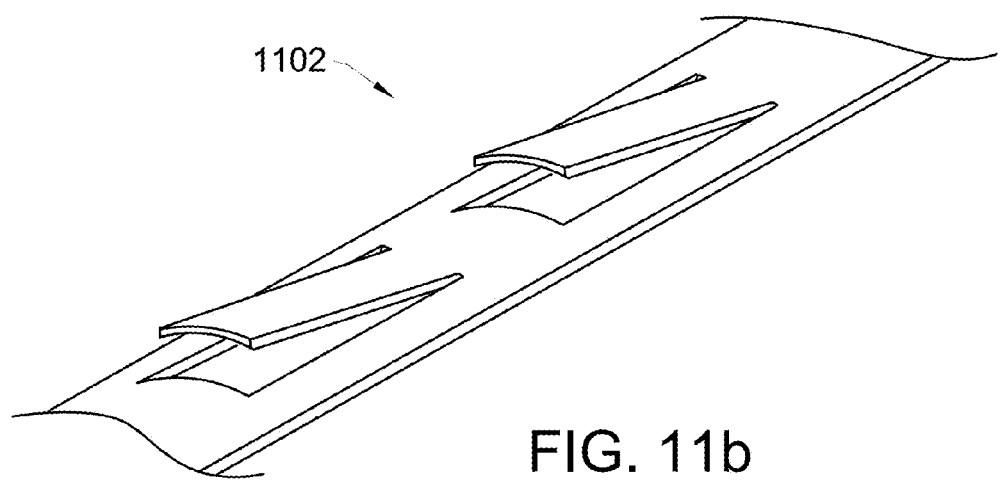

In some cases, additional features, such as reciprocating linear feed dogs, can be used to help drive the feedstock. FIGS. 11a and 11b show aspects of an articulating material dispensing system 1100 that is based on the reciprocating linear feed dog mechanism.

Referring to FIG. 11a, the articulating material dispensing system 1100 has a bendable portion that creates articulation. The system includes reciprocating drive dogs 1102 which can be flexible members with asymmetric teeth that drive material feedstock when the feed dogs are moved in one direction (toward the distal nozzle end) and which can slide back along the feedstock without inducing motion in the feedstock to effect the reverse portion of the reciprocation motion. The feed dog teeth 1104 can bite into the feedstock to create a positive interlock during the forward portion of the reciprocation. Alternatively, the teeth 1104 can interlock with pre-existing serrations, indentations or other features on the feedstock.

The reciprocation motion can have a continuous speed or it can have different speeds for the forward and reverse portions of the motion, for example the reverse portion can happen much faster than the forward portion so that more than one feed dog can be pushing forward on the feedstock at any given time. There can be more than two feed dogs 1102, for example there can be pairs or groups of feed dogs on each side of the feedstock so that there is always at least one feed dog on each side of the feedstock pushing forward at any given time. The motion of the various feed dogs can be coordinated so that while the motion of each individual feed dog can be reciprocal, the net motion imparted to the feed stock can be continuous forward motion or any desired motion profile. Different reverse feed dogs can be employed to effect reverse motion of the feed stock when needed. Or all feed dogs can be pulled backward at the same time which may create reverse feedstock motion.

Even though FIG. 11a shows an articulating material dispensing system, the linear or reciprocating feed dog system described here may also be used in a non-articulating (i.e. straight) material dispensing system and may have advantages such as increased drive force and more consistent feed drive ratio with less variation of feedrate or feed ratio between different types of material feedstocks.

FIG. 11b shows one possible construction of a flexible feed dog 1102 that can be used in a system such as that shown in FIG. 11a. Here, an isometric view of a part of a feed dog made of sheet metal is shown. The feed dog includes flexible teeth formed in the sheet metal. Flexible teeth can be helpful in that they can positively grab the feedstock when moving forward and can slide relative to the feedstock when moving in reverse. A feed dog made of thin, flexible sheet metal can be used to drive the feedstock around a bend as in the system of FIG. 11a.

Figure 12:
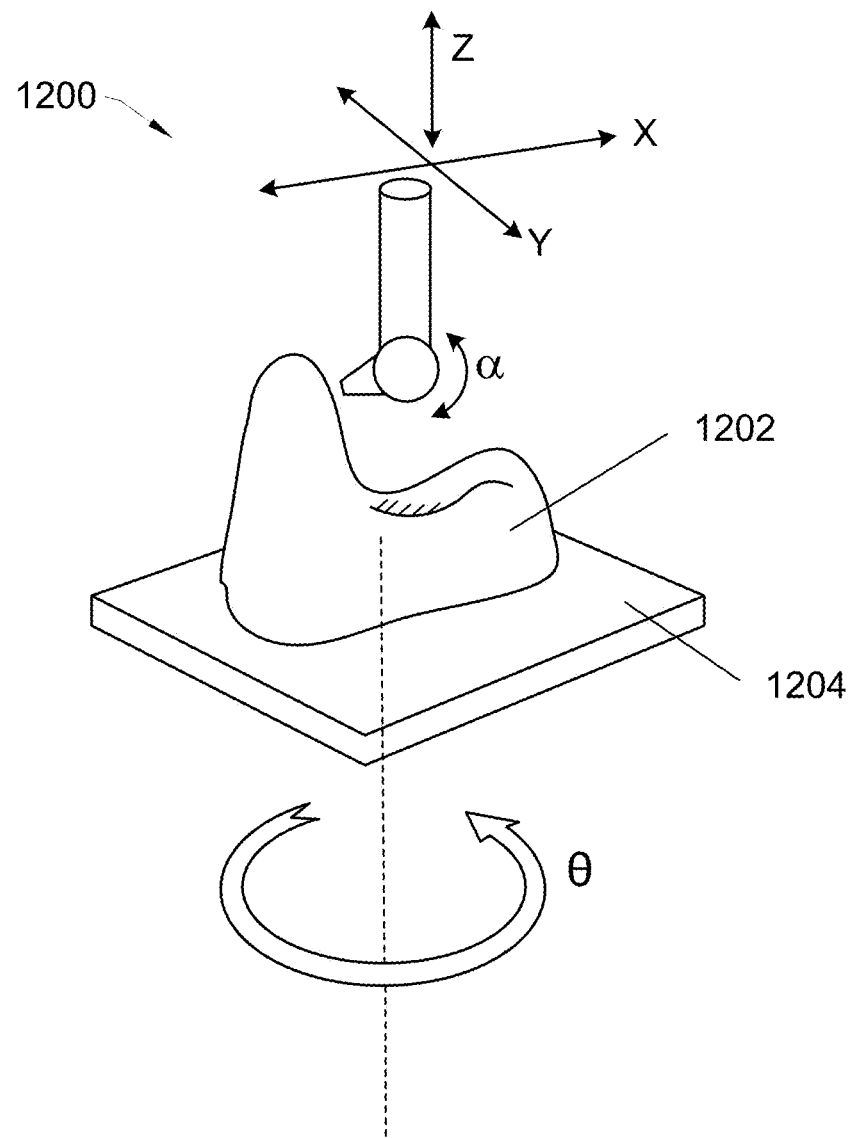
FIG. 12 shows an isometric view of an example implementation of an articulating material dispensing system having a rotating base.

FIG. 12 shows a different way to create a 5 (or more) axis material deposition system. The alternative system 1200 shown in FIG. 12 can include three linear motion axes, for example X, Y and Z. The system 1200 can include movement about a first rotational axis, such as $\alpha$, allows angular articulation of a nozzle very close to the exit orifice. Having a non-vertical rotation axis (in this case a horizontal axis) located close to the exit orifice, can allow the nozzle to fit into tight spaces while still articulating, for example to deposit material on the inside of cavities in parts. Moreover, a part 1202 that is being formed can be rotated about a second rotational axis, such as $\theta$. This can be achieved, for example, by placing the part 1202 on a rotatable base 1204 that can be rotated during deposition. The combination of the X,Y,Z, $\alpha$ and $\theta$ movements, then, as shown in FIG. 12, enables full 5-axis motion without some of the complications that may be associated with articulating a nozzle with two rotational axes.

Figure 13A:
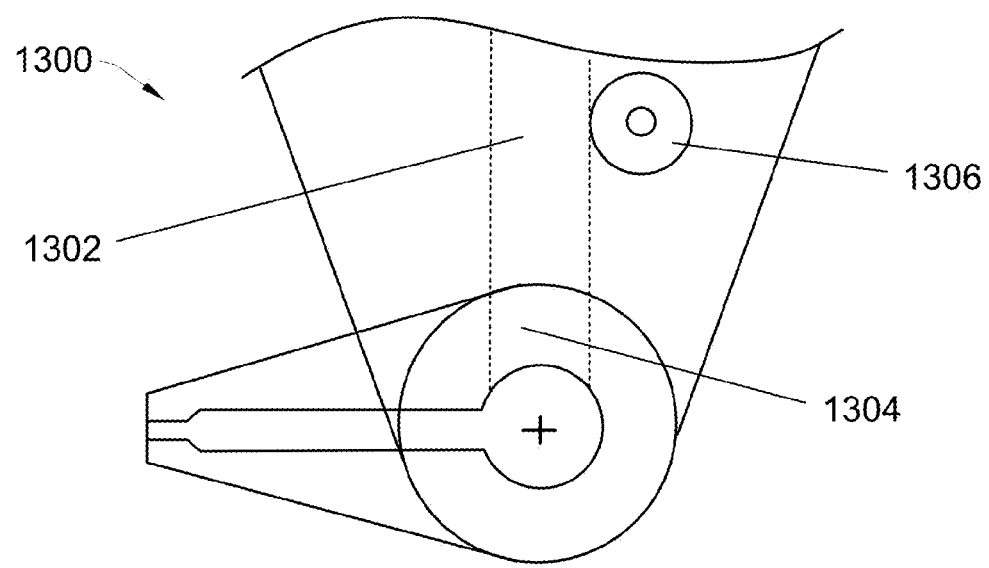
FIGS. 13a-13b show side and front cross sections views of another example implementation of an articulating material dispensing system.
Figure 13B:
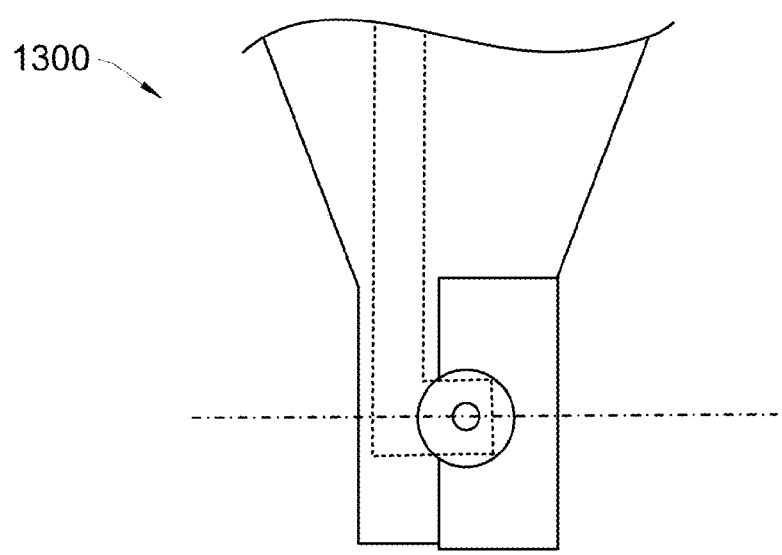

Referring now to FIGS. 13a and 13b, a material dispensing system 1300 with a nozzle mounted on a rotational axis is shown. Here, feedstock within a feedstock channel 1302 can be softened or liquefied in a liquefaction zone 1304 before it reaches the nozzle rotation axis. A drive wheel 1306 can be used to drive the feedstock through. Feedstock material can then flow sideways through a jog that is coincident with the nozzle rotation axis and then flows out through the nozzle. The jog coincident with the nozzle rotation axis can allow the nozzle to articulate through a range of motion while still providing a continuous, leak-free flow path for the feedstock material.

Figure 14A:
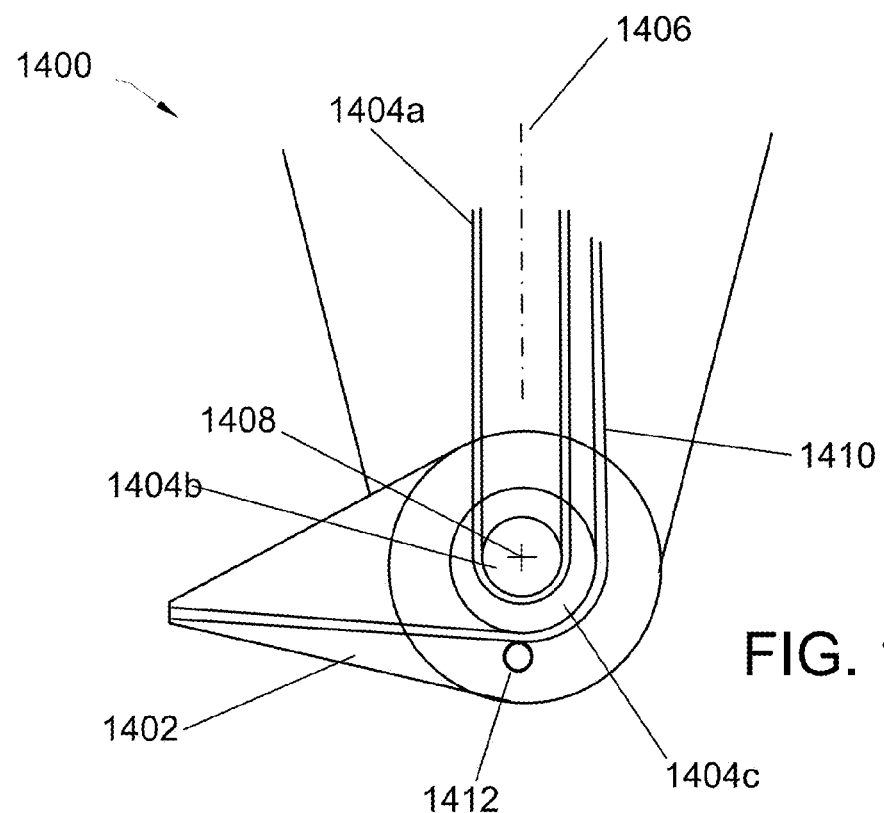
FIGS. 14a-14b show side cross section views of another example implementation of an articulating material dispensing system.
Figure 14B:
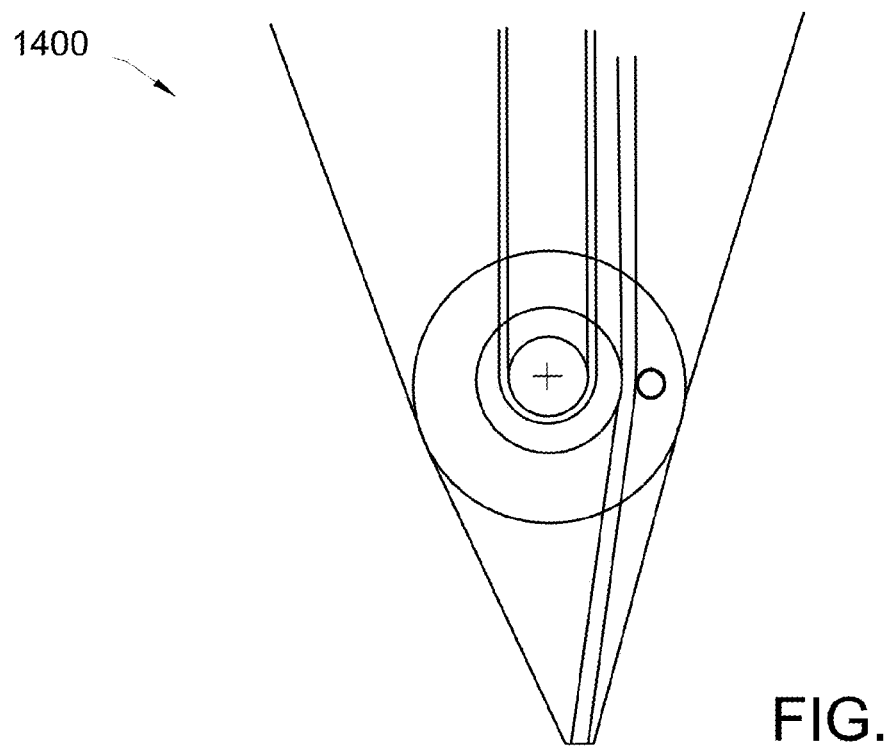

Referring to FIGS. 14a and 14b, a material dispensing system 1400 with a nozzle 1402 configured to rotate about two rotational axes is shown. The system 1400 also includes a material drive system (e.g. 1404a-c) that accommodates the range of motion of the nozzle rotation. An optional first rotation axis 1406 is shown with a vertical orientation. The nozzle can rotate about this vertical axis if this degree of freedom is present. A second rotational axis 1408 can be perpendicular to the first rotational axis 1406 (shown as horizontal, in/out of the page). Feedstock material 1410 is fed by a drive wheel 1404c to the nozzle 1402 having an exit orifice. FIG. 14a shows a side view of the system 1400 in a fully articulated position, and FIG. 14b shows a side view of the system 1400 in a non-articulated (vertical) position.

Here, the feedstock 1410 follows a path that is off to the side so that it can wrap around the drive wheel 1404c, and so that the drive wheel 1404c can be centered on the second rotational axis 1408. Having the drive wheel centered on the second rotational axis enables the drive wheel to stay in the same location as the nozzle rotates about the second axis. Having the drive wheel stay in the same position means that it can be driven by a belt 1404a from above. Additionally, having the feedstock wrap around the drive wheel can facilitate bending the feedstock around the corner when the nozzle is in an articulated position. The radius of curvature can be larger in this configuration than it would be if the feedstock had to travel axially along the nozzle and the upper portion of the dispensing system. The feedstock material can exit the nozzle in-line with the nozzle axis because the feedstock path through the nozzle can guide it from being non-axial to becoming aligned with the nozzle axis just before it exits. An idler bearing can maintain pressure between the feedstock and the drive wheel. The idler bearing 1412 can be spring loaded so that it applies a relatively constant force to pinch the feedstock between itself and the drive wheel. The idler bearing can be affixed to the nozzle portion of the dispensing system so that when the nozzle rotates about the second axis, the idler bearing rotates with it so that it is always pinching the feedstock to the drive wheel just at the point before the feedstock enters the body of the nozzle, which can help in getting the feedstock to travel around the bend. The drive wheel can be actuated by a drive belt that can be driven by a motor or other actuator that is proximal of the drive wheel. In some cases, an additional set of drive belt and pulley can be used to control the articulation of the nozzle 1402 about the second rotation axis. The drive wheel motion can be coordinated with the rotation of the nozzle about the second axis so that the feedstock is not inadvertently fed or retracted when the nozzle rotates about the second axis.

Figure 15A:
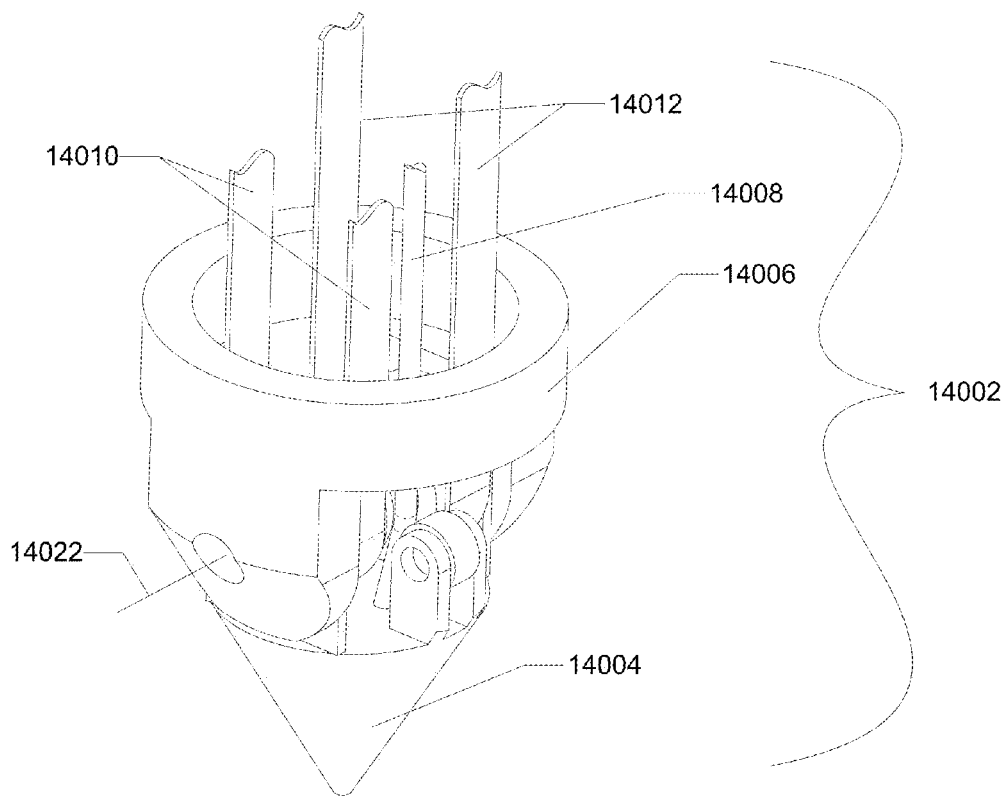
FIGS. 15a-15e show various views of another example implementation of an articulating material dispensing system.

FIGS. 15a-15e show another implementation of the multi axis material deposition system. Referring to FIG. 15a, an isometric view of a multi-axis material deposition system 14002 is shown. A material deposition nozzle 14004 is rotatable with respect to a base 14006 about a rotation axis 14022. A material 14008 which can be a filament can be fed through nozzle 14004. The base 14006 can move along, for example, the x, y, z axes and may be referred to as a movable support relative to which the nozzle 14004 can rotate. A feed drive belt 14010 can be used to transfer feed forces in order to feed material 14008. A nozzle positioning drive belt 14012 can be used to transfer positioning forces in order to rotate nozzle 14004.

Figure 15B:
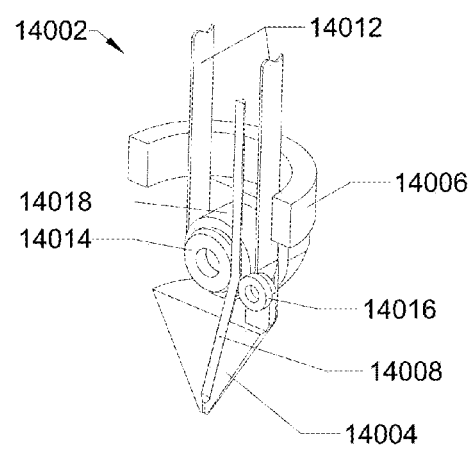

Referring to FIG. 15b, a path of material 14008 through nozzle 14004 is visible. Hatching has been omitted for clarity. A material drive wheel 14014 can drive material 14008 with the aid of a pinch roller 14016. Positioning drive belt 14012 can drive a positioning pulley 14018.

Figure 15C:
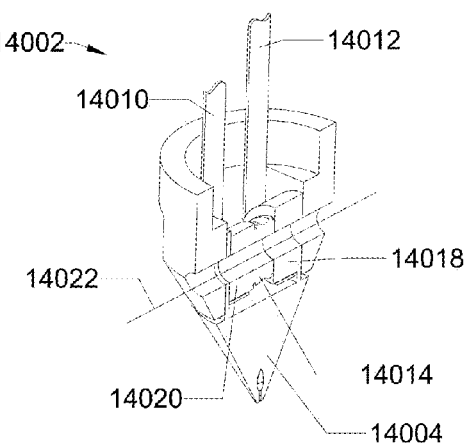

FIG. 15c shows an isometric section view of system 14002 with the section plane passing through nozzle rotation axis 14022. As shown, a positioning pulley 14018 is driven by positioning drive belt 14012 and is connected to nozzle 14004 so that when positioning drive belt 14012 moves, it results in rotation of nozzle 14004 about axis 14022. Drive wheel 14014 is connected to a material drive pulley 14020 which is driven by belt 14010 so that when belt 14010 moves, material 14018 (see FIG. 15b) is fed through nozzle 14004.

Figure 15D:
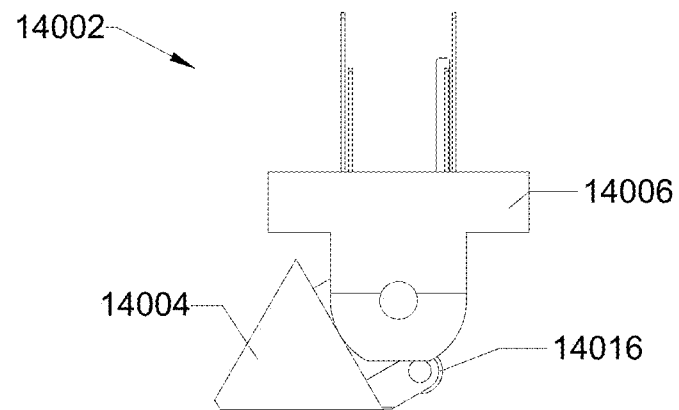
Figure 15E:
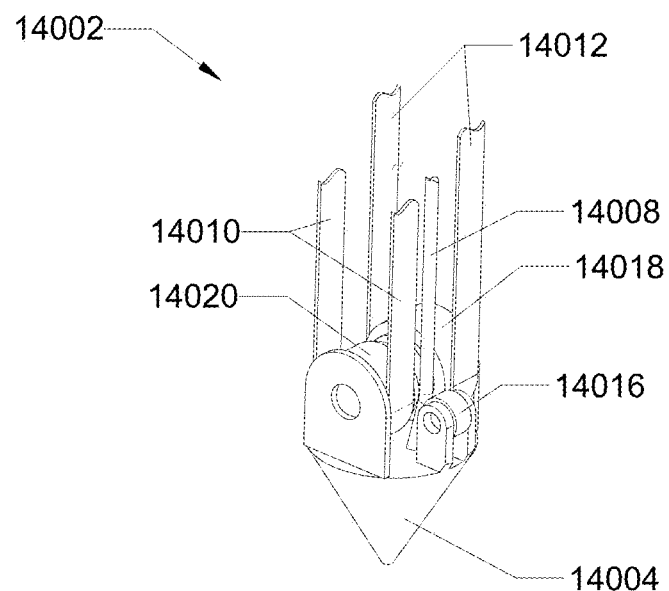

FIG. 15d shows a front view of system 14002 in which nozzle 14004 is in a rotated position with respect to base 14006. FIG. 15e shows an isometric view of system 14002 with base 14006 removed for clarity to show the other components.

Figure 16:
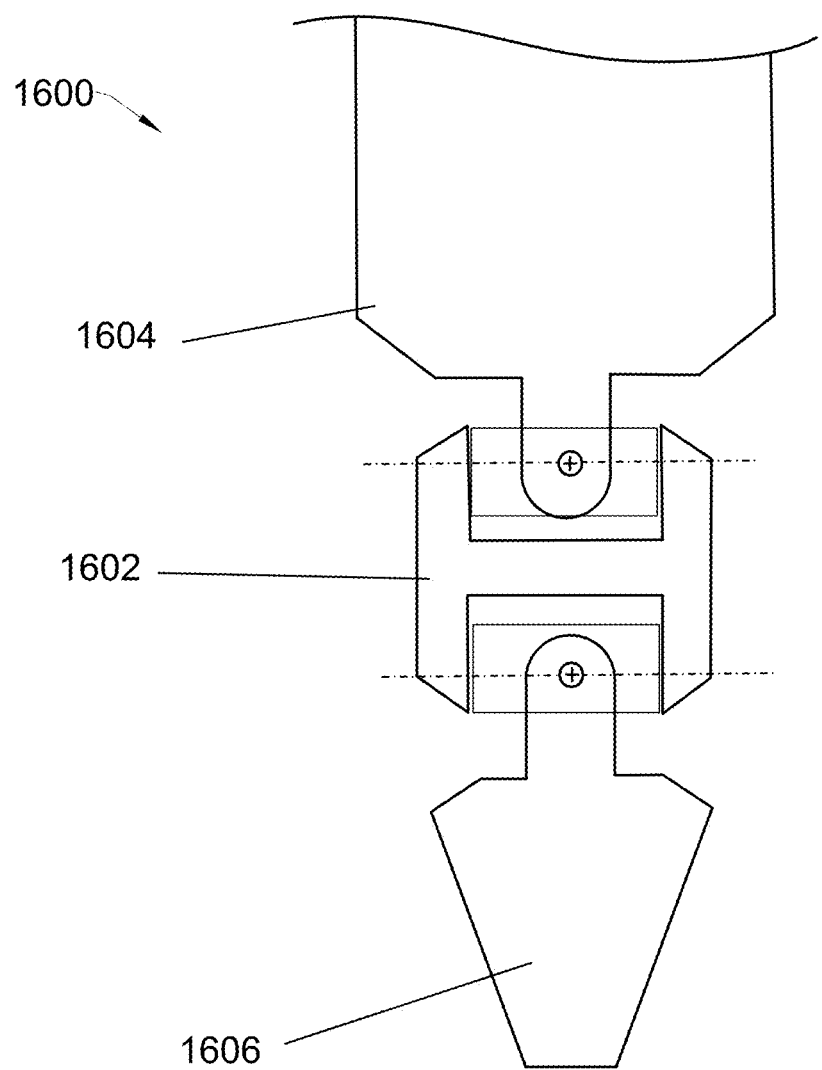
FIG. 16 shows a side view of another example implementation of an articulating material dispensing system.

Referring now to FIG. 16, another version of a material dispensing system 1600 having multiple rotational degrees of freedom is shown. Here, a center coupler 1602 couples a main body 1604 and a nozzle 1606. Additional linkage parts between the coupler and the main body and the coupler and the nozzle can be used but are not shown here for sake of clarity.

As shown, there are four rotation axes: two parallel rotation axes that are horizontal in the plane of the page; and another two parallel horizontal rotation axes that are projecting in and out of the plane of the page. Using multiple parallel axes means that rotation at each axis can be limited, for example limited to 45 degrees, which can be helpful in avoiding instability or lock-up conditions. Cables, pushrods or other actuators can be used to control the rotation of the nozzle relative to the base part. Elastomeric, springy, or compliant members can be connected to the nozzle, coupler and base part to create predictable, deterministic motion given simple push/pull inputs from cables or actuators. In some cases, additional linkages can be employed to further constrain motion, for example linkages or gears can be used to constrain the angular rotation about pairs of parallel axes to be equal or to be in some other deterministic ratio.

Referring now to FIGS. 17-24, additional implementations of the interlocking feature, similar to those described above in FIG. 5, are described. FIG. 17a shows an isometric view of an element 16002 which can be made of a continuous material 16004. Element 16002 can have an interlocking feature 16006 in one or more locations. Interlocking features 16006 can have a neck 16008 and one or more locking areas 16010. FIG. 17b shows a top view of the element 16002, and FIG. 17c shows a front view of element 16002. Interlocking features 16006 with neck 16008 and locking areas 16010 can be seen.

Element 16002 can be formed by deposition of material 16004 such that element 16002 is continuous—i.e. it does not have any breaks in it. Material 16004 can be or can contain continuous fibers. Interlocking features 16006 can be formed by forcing continuous material into a cavity in another part or in previously deposited material (for example see FIGS. 21a and 21b). The exact structure of interlocking features 16006 can take a variety of forms and the exact packing or path of continuous material 16004 can vary considerably, but it can form neck 16008 and locking areas 16010 regardless of specific packing arrangement. This is similar to the way a length of rope pushed into a box will take the net shape of the box regardless of the specific coil or path of the rope. Material 16004 can be a thermoplastic, fibers, a thermoset, a metal, a composite, a medium with living cells, a biologic material, a mineral material or any combination thereof.

Figure 18:
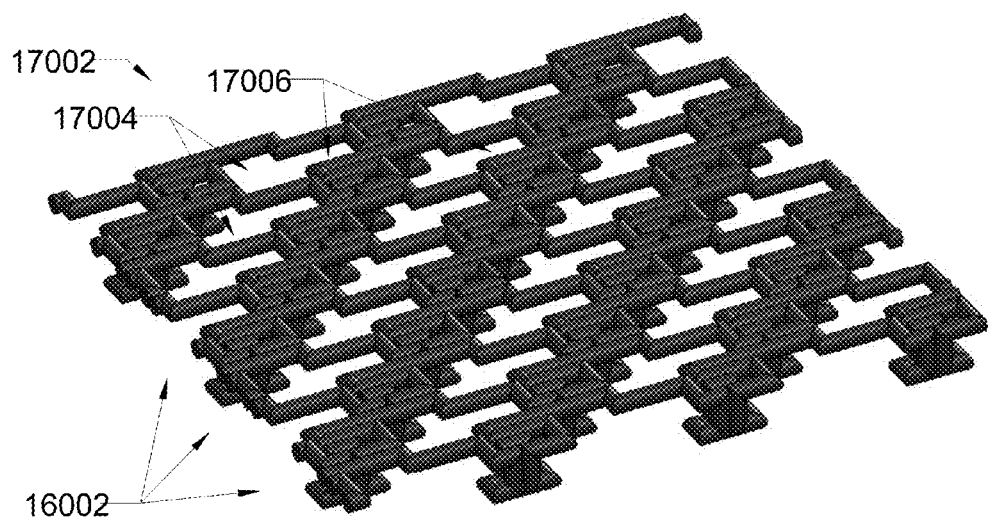
FIG. 18 shows multiple elements from FIGS. 17a-17c deposited next to each other.

Referring to FIG. 18, a layer 17002 made up of elements 16002 deposited next to one another is shown. Elements 16002 can be joined (all formed continuously) or they can be separate. Layer 17002 can be a planar array of elements 16002 or it can be non-planar or it can be curved or it can be irregular. Gaps 17004 and 17006 are left between elements 16002 in areas where elements 16002 don't touch. Gaps 17004 can be larger than gaps 17006.

Figure 17A:
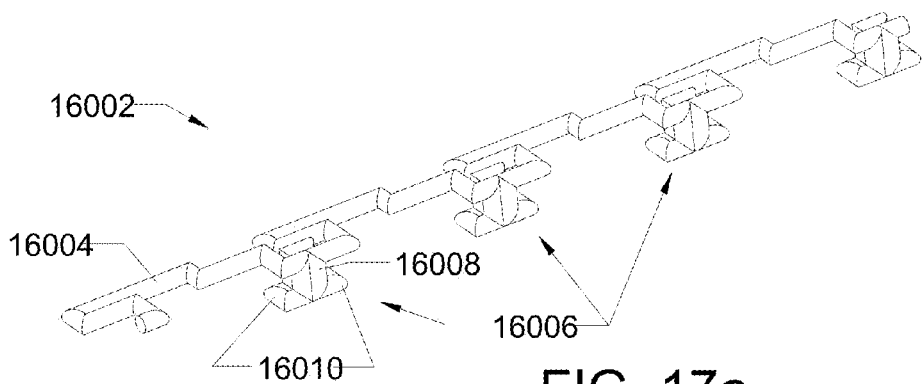
FIGS. 17a-17c show isometric, top, and front views of an example deposited element having an interlocking feature.
Figure 17B:
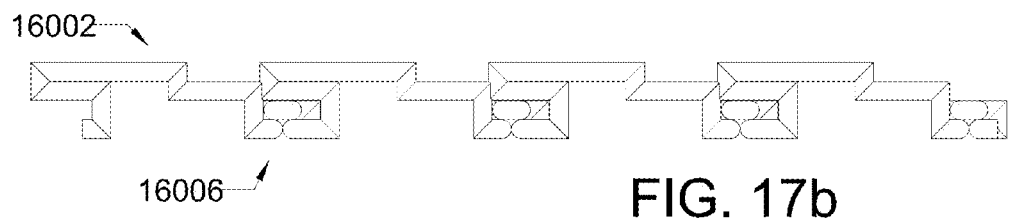
Figure 17C:
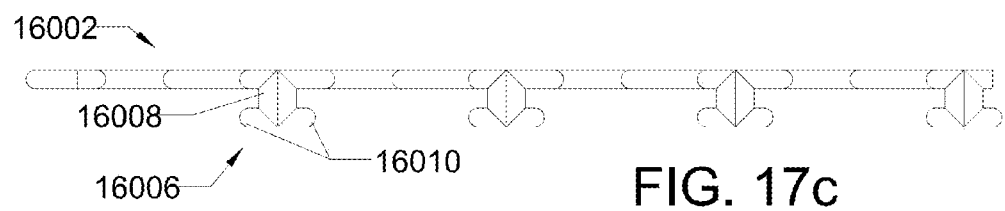
Figure 19A:
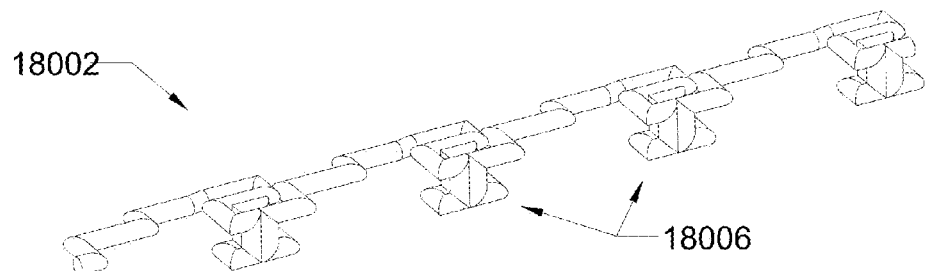
FIGS. 19a-19c show isometric, top, and front views of another example deposited element having an interlocking features.
Figure 19B:
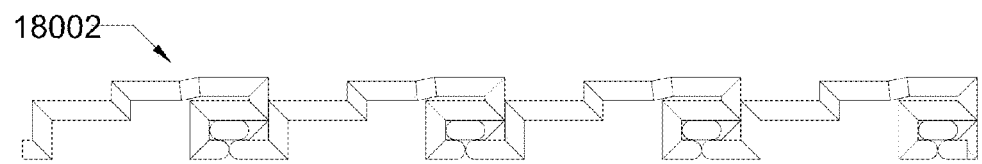
Figure 19C:
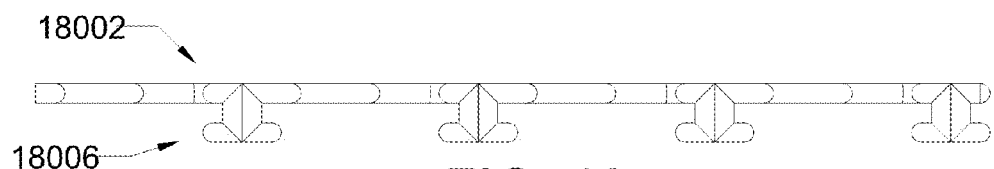
Figure 20:
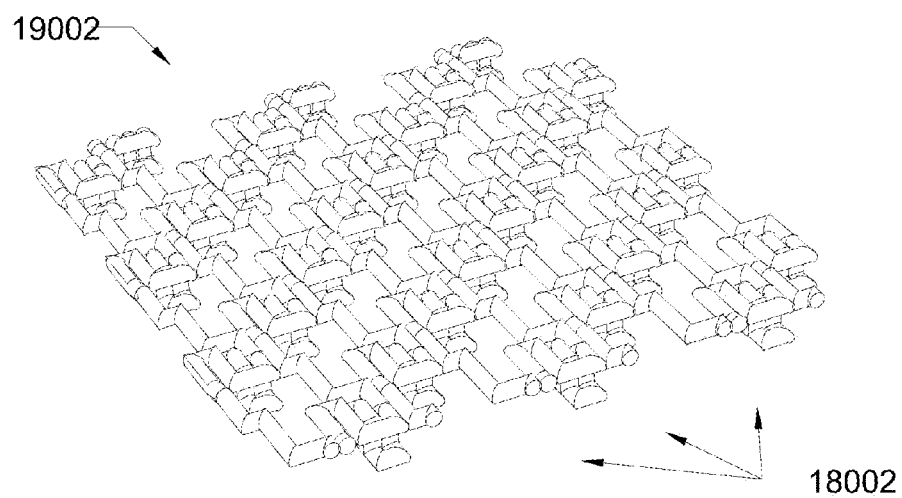
FIG. 20 shows multiple elements from FIGS. 19a-19c deposited next to each other.

FIGS. 19a-19c show isometric, top, and front views, respectively, of an element 18002, which is generally similar to element 16002 of FIGS. 17a-c, but can have a different shape or be formed in a different orientation. Element 18002 can have interlocking features 18006 similar to interlocking features 16006. FIG. 20 shows a layer 19002 made up of elements 18002 deposited next to one another. Layer 19002 can be similar to layer 17002 but it can be formed in a different orientation and it can be formed on top of layer 17002 (see FIG. 21a).

Figure 21A:
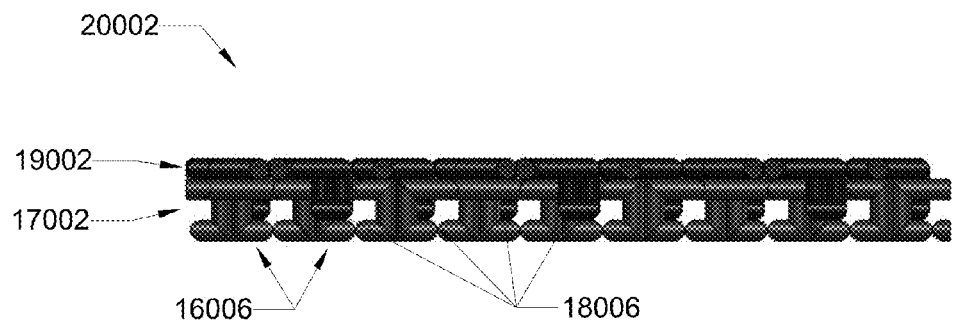
FIGS. 21a-21b show front and isometric views of an example two-layer interlocking structure.
Figure 21B:
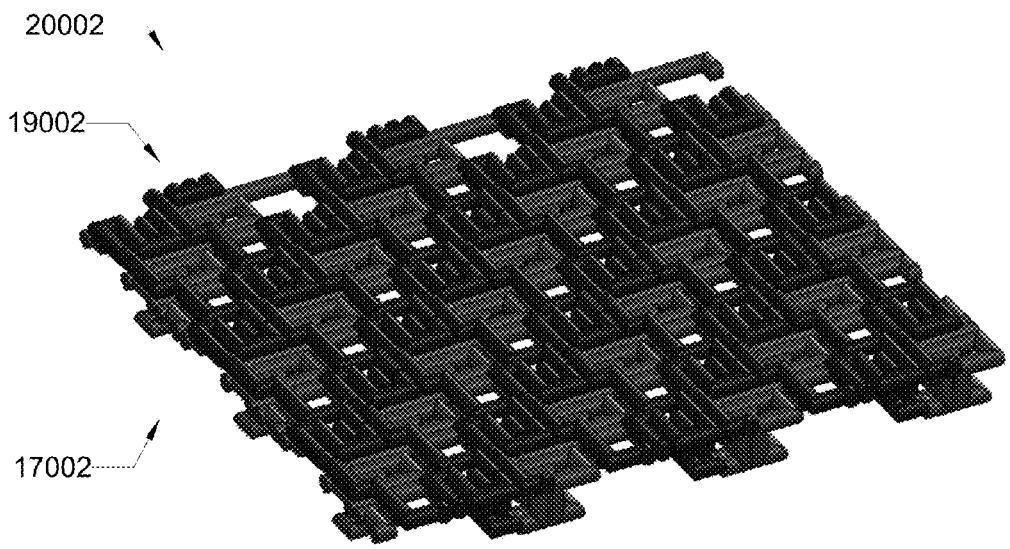

FIGS. 21a and 21b show an incomplete part with two layers together. This represents layers in a partially built part. In detail, FIG. 21a shows a front view of a part 20002 which includes layer 17002 and layer 19002. Interlocking features 16006 and 18006 are visible as part of layers 17002 and 19002 respectively. Interlocking features 18006 can have their shape defined as they are formed by being pushed into spaces in the shape of layer 17002, such as gaps 17004 and 17006. FIG. 21b shows an isometric view of part 20002.

Figure 22A:
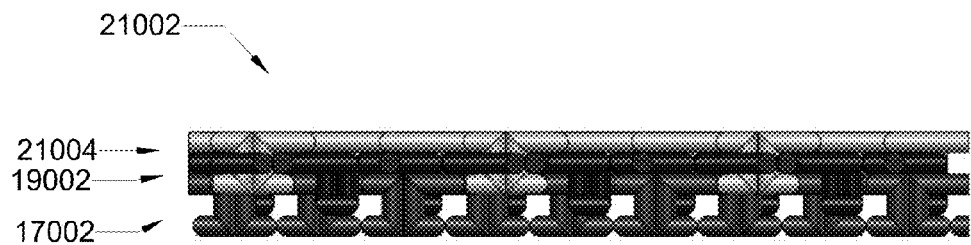
FIGS. 22a-22b show front and isometric views of an example three-layer interlocking structure.
Figure 22B:
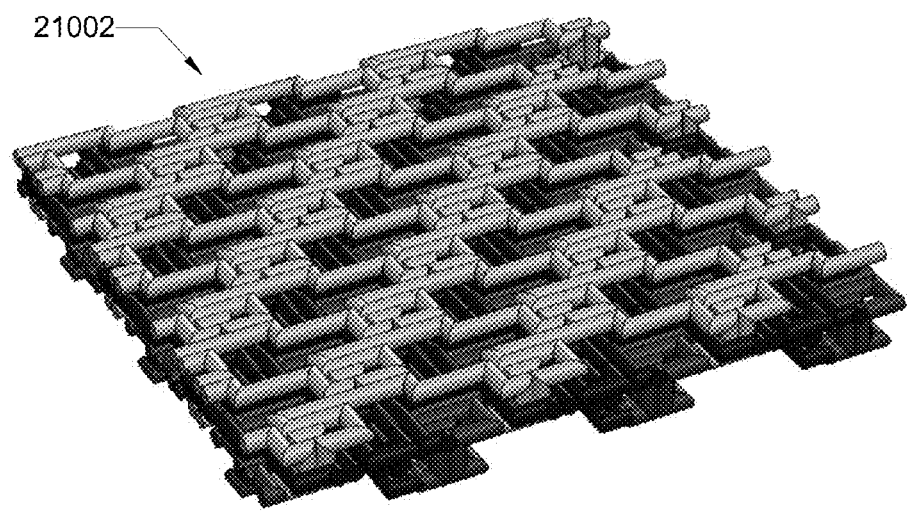

Referring now to FIGS. 22a and 22b, a part that is being built with three interlocking layers together is shown. In more detail, FIG. 22a shows a front view of a part 21002. Part 21002 includes layers 17002, 19002 and a third layer 21004. Layer 21004 can be the same as layer 17002, but the pattern is shifted. Locking features (not visible) from layer 21004 pass though narrow gaps in layer 19002 and fill larger gaps in layer 17002. The narrow gaps can be similar to gaps 17006 in FIG. 18. However, such gaps are not visible in this figure. The larger gaps can be gaps 17004. By taking the shape of the narrow gaps in layer 19002 and then filling the larger gap in layer 17002, an interlocking feature of layer 21004 can create a physical interference or lock between the layers which can prevent separation of the layers. A physical interference can be stronger and be more effective at preventing delamination of layers than a chemical bond alone. Material including strong fibers can thus be oriented transverse to the layers in the interlocking features and the strength of part 21002 can be closer to isotropic than in a typical part without interlocking features or transverse fibers between layers.

Figure 23A:
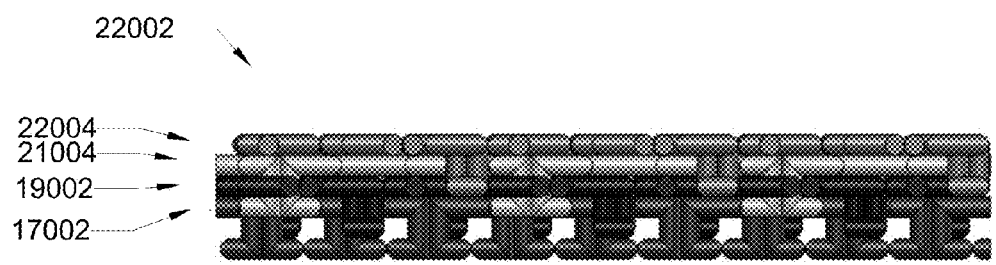
FIGS. 23a-23b show front and isometric views of an example four-layer interlocking structure.
Figure 23B:
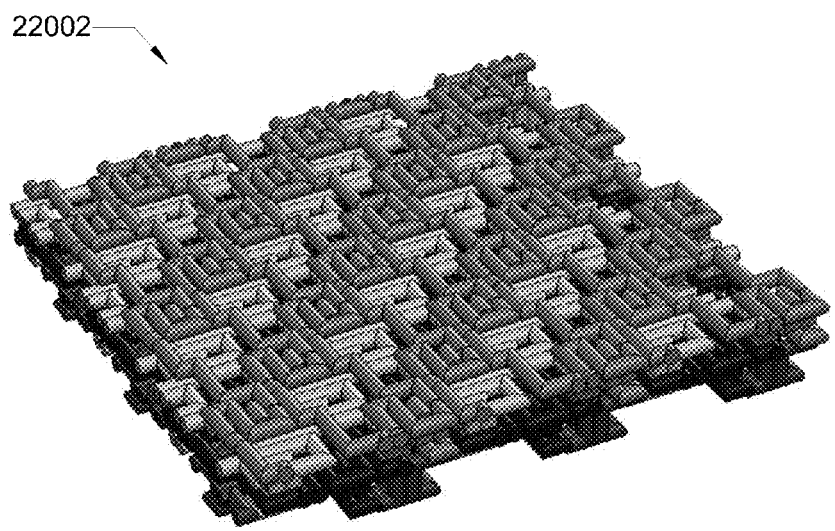

FIG. 23a shows a front view of a part 22002 made of four interlocking layers including layers 17002, 19002, 21004 and a fourth layer 22004. Layer 22004 may be the same as layer 19002 but it can be shifted to fit properly and achieve the desired arrangement of gaps and locking features. A set of 4 layers such as part 22002 may form a repeating unit, that is no more unique layer shapes or states are needed to continue to build the part. A fifth layer added on top of layer 22004 can be identical in shape and lateral position (shift) to layer 17002. Sets of these four layers can be repeated indefinitely to achieve a desired part thickness. FIG. 23b shows an isometric view of part 22002.

Figure 24A:
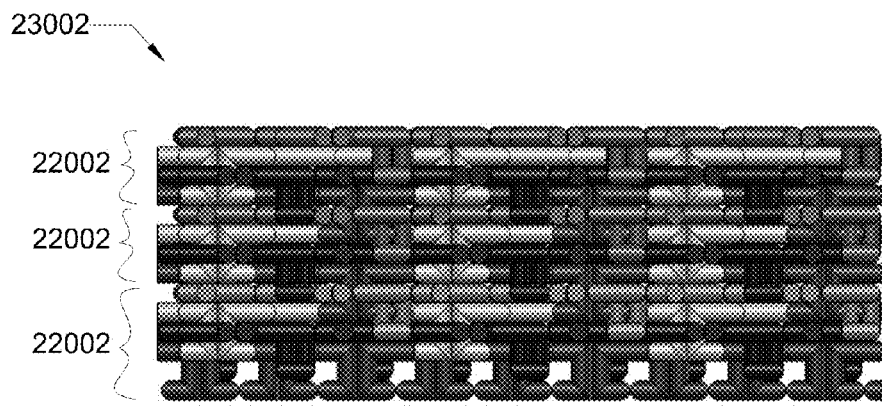
FIGS. 24a-24b show front and isometric views of an example twelve-layer interlocking structure.
Figure 24B:
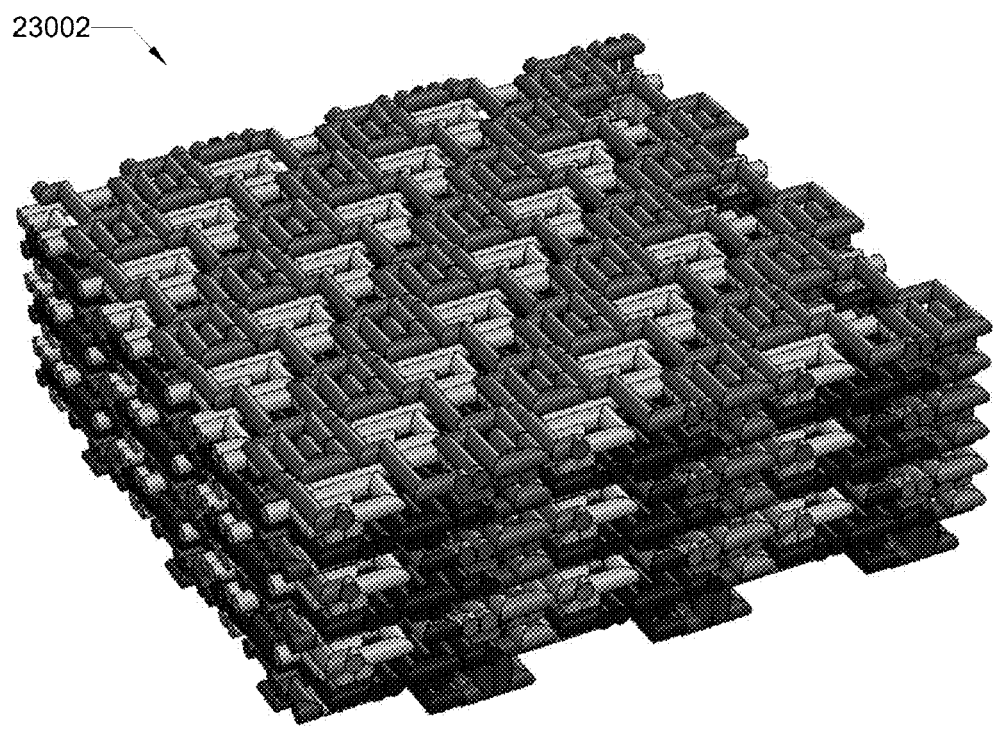

Referring now to FIGS. 24a and 24b, a part that is being built with twelve interlocking layers together is shown. FIG. 24a shows a front view of a part 23002 made of three parts 22002, which are each four interlocking layers, arranged so that part 23002 has a total of twelve interlocking layers. FIG. 24b shows an isometric view of part 23002.

In all implementations shown above, all layers can be made of a single continuous material or fiber or fiber bundle. In some cases, each layer or element can be made of separate materials or fibers or fiber bundles.

Implementations of the subject matter described in this specification can be implemented in combination with digital electronic circuitry, or computer software, firmware, or hardware. Implementations of the subject matter described in this specification can be implemented in an additive manufacturing system that uses one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims.

What is claimed is:

1. A system for fabricating an object, the system comprising:
    an extruder for one or more deposition materials, the extruder comprising at least one nozzle and a movable support for the nozzle, wherein the nozzle has a nozzle axis and is rotatably attached to the movable support via a connector that is actuatable relative to the movable support to change an angular orientation of the nozzle axis relative to the movable support so as to vary an angle between the nozzle axis and a deposition surface during deposition of a deposition material; and
    a controller coupled with the extruder, the controller configured and arranged to apply an adjustment calculated for a path of the nozzle based on the angle formed between the nozzle axis and the deposition surface being an acute angle, the adjustment for the nozzle moving toward the acute angle being different from the adjustment for the nozzle moving away from the acute angle,
    wherein the controller is configured to remove differences in thickness of the deposited material caused by variations in the angle formed between the nozzle axis and the deposition surface by moving the nozzle according to the adjustment such that a distance between the nozzle and the deposition surface is larger when the nozzle is moving away from the acute angle compared to when the nozzle is moving toward the acute angle.

2. The system of claim 1, wherein the connector is configured to be actuated with at least two degrees of freedom for the nozzle relative to the movable support.

3. The system of claim 2, wherein the extruder includes a softening zone positioned upstream of an actuation point of the connector, the softening zone being configured to increase flexibility of a feedstock material passing through the softening zone.

4. The system of claim 3, wherein the softening zone is configured to apply heat to the feedstock material passing therethrough.

5. The system of claim 3, wherein the extruder includes forming rollers that are configured to flatten the feedstock material passing therethrough.

6. The system of claim 1, wherein the nozzle includes the connector.

7. The system of claim 1, wherein the system is configured to move the movable support and the nozzle relative to the object being fabricated along three orthogonal axes to thereby provide three degrees of freedom relative to the object, the nozzle being rotatably attached to the movable support via the connector to rotate about a first axis that is transverse to the nozzle axis to thereby provide a fourth degree of freedom relative to the object, and wherein the system includes a rotatable base on which the object being fabricated is placed, the controller being configured to rotate the base during deposition to thereby provide a fifth degree of freedom between the nozzle and the object.

8. The system of claim 1, wherein the system is configured to move the movable support and the nozzle relative to the object being fabricated along three orthogonal axes to thereby provide three degrees of freedom relative to the object, the nozzle being rotatably attached to the movable support via the connector to rotate about a first axis that is transverse to the nozzle axis to thereby provide a fourth degree of freedom relative to the object, and wherein the connector is rotatably connected to the movable support to allow the connector and the nozzle to rotate about the nozzle axis to thereby provide a fifth degree of freedom relative to the object.

9. The system of claim 1, wherein the system is configured to move the nozzle relative to the object being fabricated along three orthogonal axes to thereby provide three degrees of freedom relative to the object, and wherein the connector includes a multi-link coupler that is rotatably attached to the movable support to rotate about a first axis that is transverse to the nozzle axis, the nozzle being rotatably attached to the multi-link coupler to rotate about a second axis that is transverse to the first axis to thereby provide two additional degrees freedom relative to the object.

10. The system of claim 1, wherein the controller is configured to apply the adjustment that causes the nozzle and the movable support to become farther from the deposition surface when the nozzle is moving away from the acute angle.

11. The system of claim 1, wherein the controller is configured to apply the adjustment that causes the nozzle and the movable support to become closer to the deposition surface when the nozzle is moving toward the acute angle.

12. The system of claim 1, wherein based on the nozzle moving away from the acute angle, the controller is configured to apply the adjustment that causes the nozzle and the movable support to become farther from the deposition surface, and wherein based on the nozzle moving toward the acute angle, the controller is configured to apply the adjustment that causes the nozzle and the movable support to become closer to the deposition surface.

13. The system of claim 1, wherein the controller is configured to change the angular orientation of the nozzle axis relative to the movable support to thereby avoid making contact avoid contact between the nozzle and the deposition surface.

14. The system of claim 1, wherein the extruder includes a feedstock channel through which a feedstock material passes during deposition, the feedstock channel providing a curved path between the extruder and the rotated nozzle, and wherein the controller is configured to change a volume flow rate of the feedstock material according to a curvature of the feedstock channel.

* * * * *

UNITED STATES PATENT AND TRADEMARK OFFICE
CERTIFICATE OF CORRECTION

PATENT NO. : 9,533,449 B2  
APPLICATION NO. : 14/745285  
DATED : January 3, 2017  
INVENTOR(S) : James Sherwood Page Page 1 of 1

It is certified that error appears in the above-identified patent and that said Letters Patent is hereby corrected as shown below:

In the Claims

Column 18, Lines 63-64, in Claim 13: after "thereby" delete "avoid making contact".

Signed and Sealed this  
Fourteenth Day of March, 2017

Michelle K. Lee  
*Director of the United States Patent and Trademark Office*